(12) United States Patent
Nasset, Sr. et al.

(10) Patent No.: US 6,179,387 B1
(45) Date of Patent: Jan. 30, 2001

(54) VEHICLE WHEEL MASK FOR PROTECTION OF WHEEL'S FINISH WHEN DETAILING AND APPLYING CHEMICAL TREATMENTS TO TIRES

(76) Inventors: Brent T. Nasset, Sr., 4326 Glencoe St. NE., Salem, OR (US) 97301; Brian K. McClain, 3868 Helen Ave. SE., Salem, OR (US) 97302

(*) Notice: Under 35 U.S.C. 154(b), the term of this patent shall be extended for 0 days.

(21) Appl. No.: 09/303,984

(22) Filed: May 3, 1999

(51) Int. Cl.[7] .................................................... B60B 7/06
(52) U.S. Cl. ..................... 301/37.1; 301/37.37; 118/504
(58) Field of Search ................................ 301/37.1, 37.42, 301/37.31, 37.32, 37.35, 37.36; 118/504, 505

(56) References Cited

U.S. PATENT DOCUMENTS

| | | | |
|---|---|---|---|
| 2,812,215 | * 11/1957 | Waite | 301/37.42 |
| 3,436,123 | * 4/1969 | Aske, Jr. et al. | 301/37.42 X |
| 4,811,991 | * 3/1989 | Moreno et al. | 301/37.1 |
| 4,955,670 | * 9/1990 | Koller | 301/37.42 X |
| 5,423,599 | * 6/1995 | Sherod et al. | 301/37.1 |
| 5,435,630 | * 7/1995 | Tucker | 301/37.1 |
| 5,524,972 | * 6/1996 | Cailor et al. | 301/37.42 |

* cited by examiner

Primary Examiner—Russell D. Stormer

(57) ABSTRACT

A temporary hand-held wheel spray mask (120) for detailing tires (112) to protect vehicle wheels (114) during chemical treatment of tires is a unitary thin plastic molded device having a generally circular opening for mating against the vehicle wheel and a generally domed or flattened concave body enclosure (128). The generally circular opening is defined as an annular flange (122) or a thin walled cylindrical section (126). This flange (122) or thin walled cylindrical section (126) is positioned against the outermost diameter of the face (116) of vehicle wheel; where the outermost diameter of the annular flange (122) or thin walled cylindrical section (126) closely matches the outermost diameter of the vehicle wheel (114), such that a plurality of unique and separate wheel spray masks (120) will be offered. While the wheel spray mask (120) is positioned against the wheel (114), light pressure is applied by the user to an integral or separately affixed handle (132) on the wheel spray mask. The generally domed or flattened concave body (128) will provide an overall masking function along with the annular (122) flange or thin walled cylindrical section (126) providing a barrier against overspray and direct liquid run-off. For added improved sealing protection, a seal or gasket (134) can be added to the face of the annular flange (122) or to the edge of the cylindrical section (126).

8 Claims, 29 Drawing Sheets

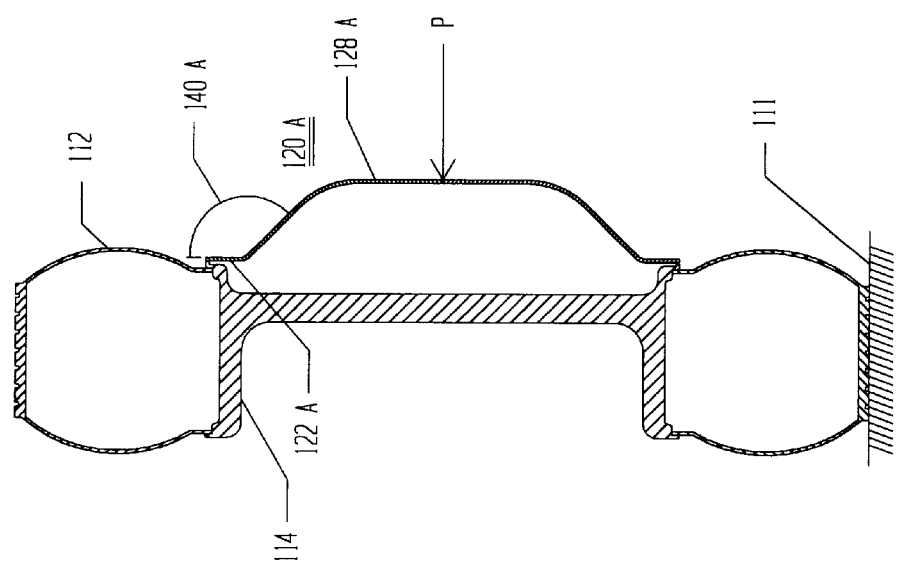
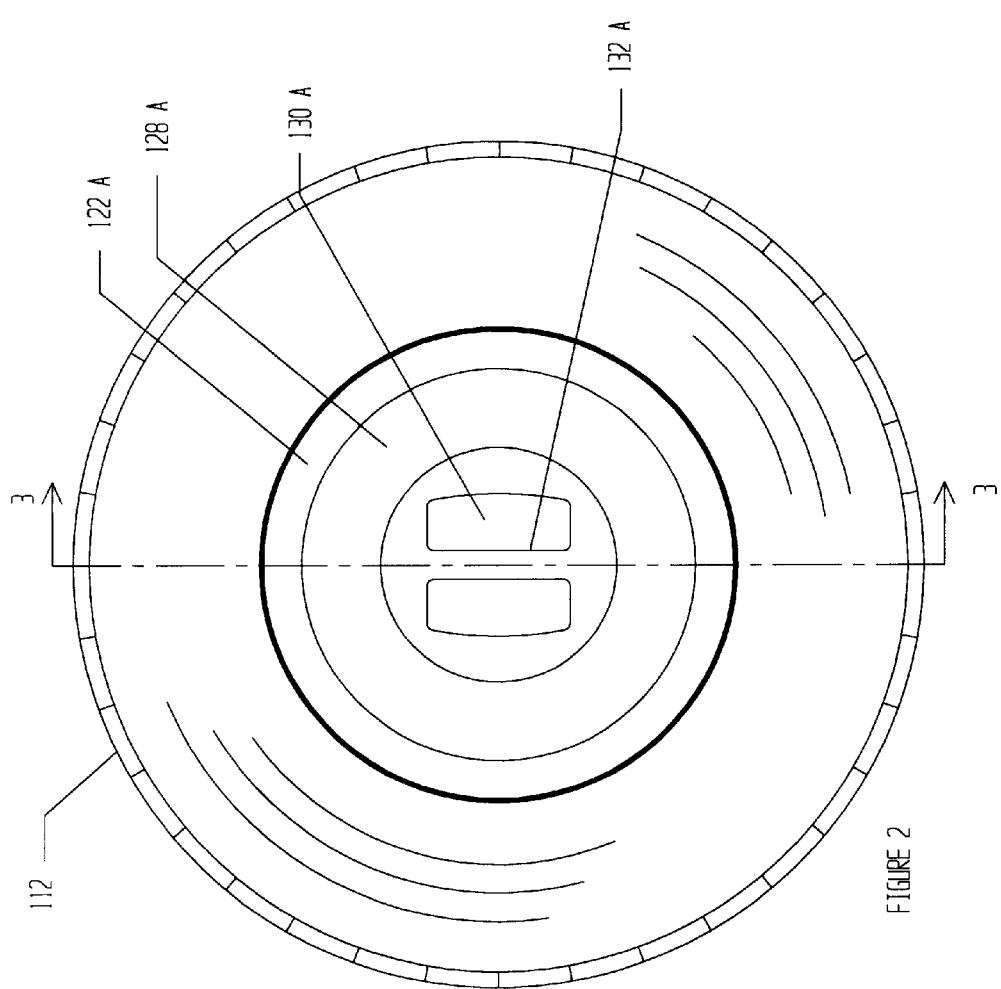

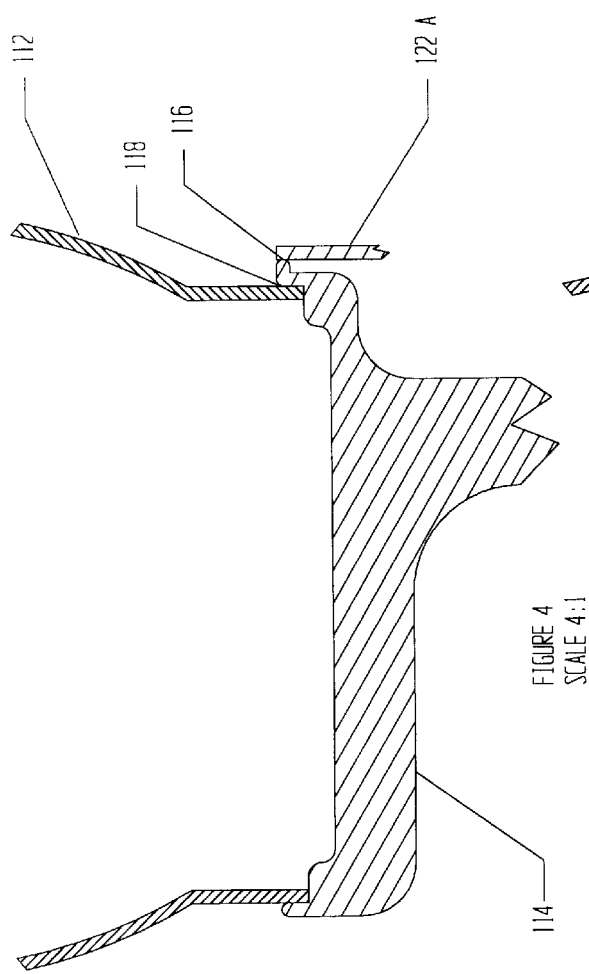
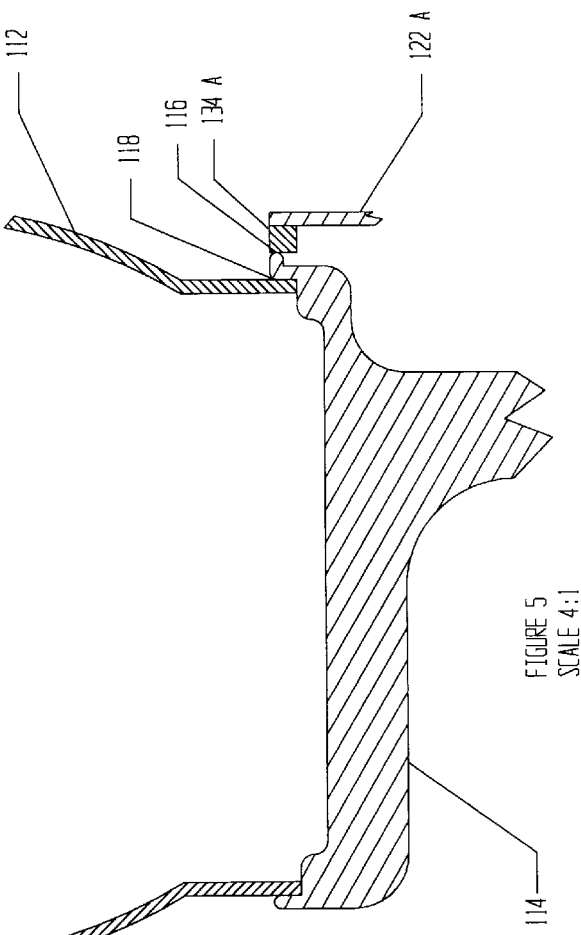

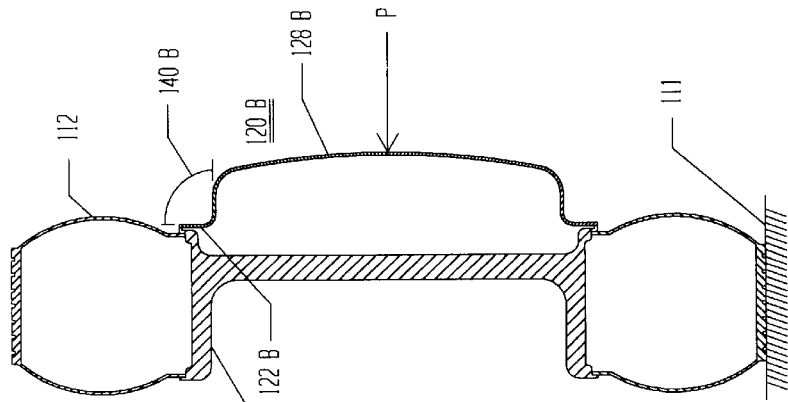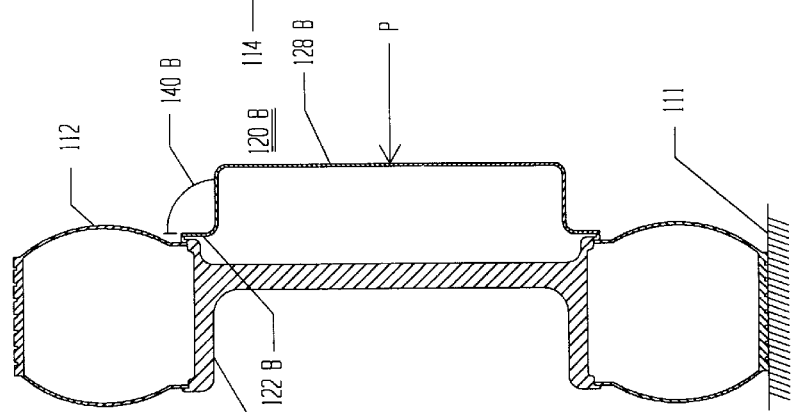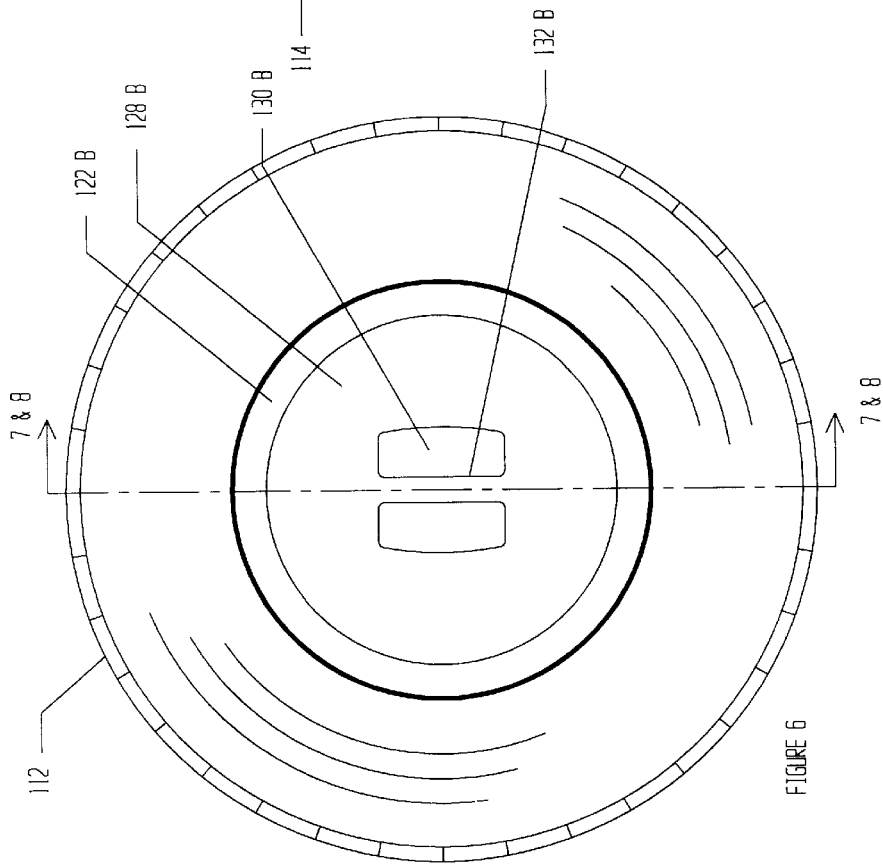

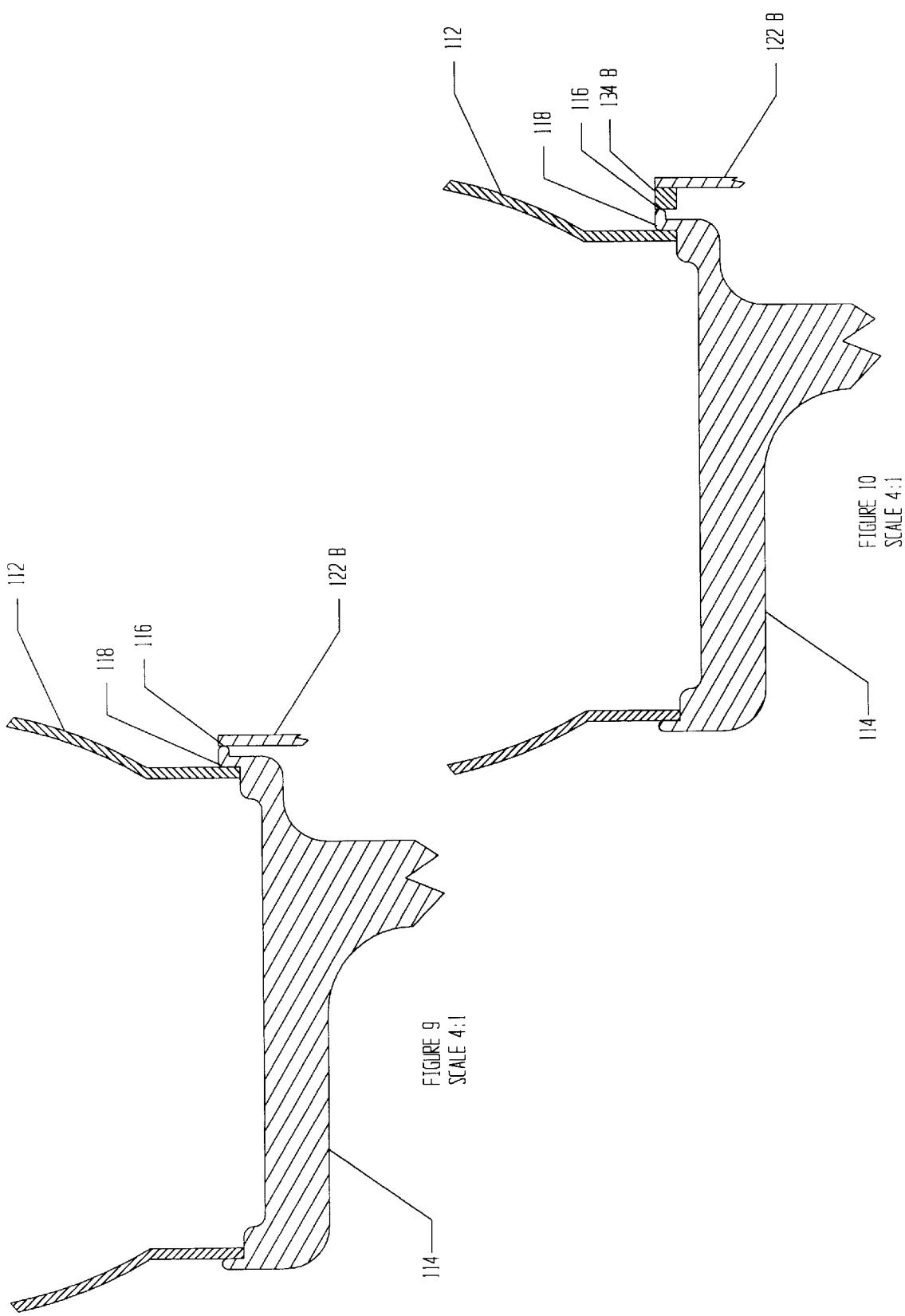

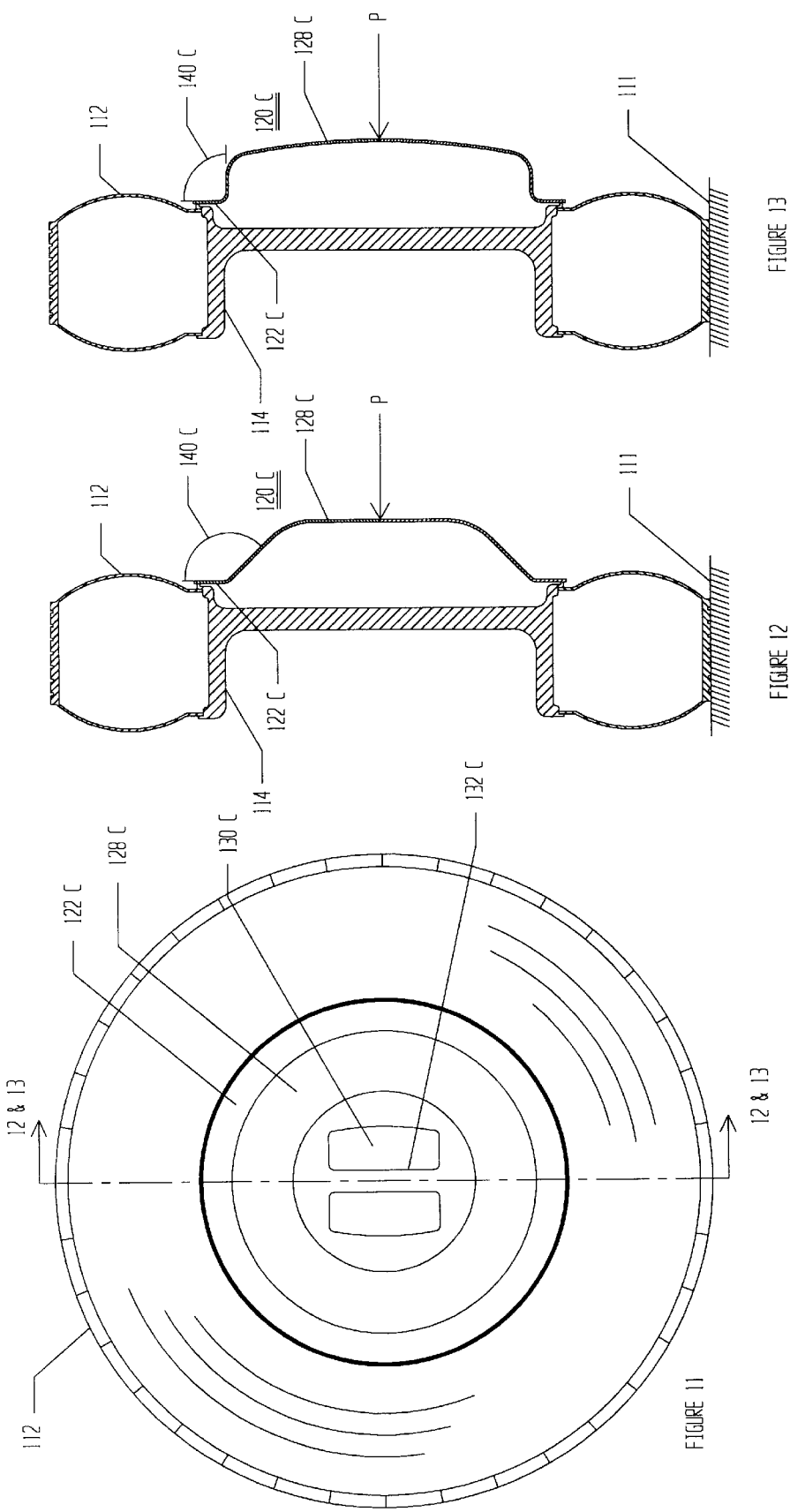

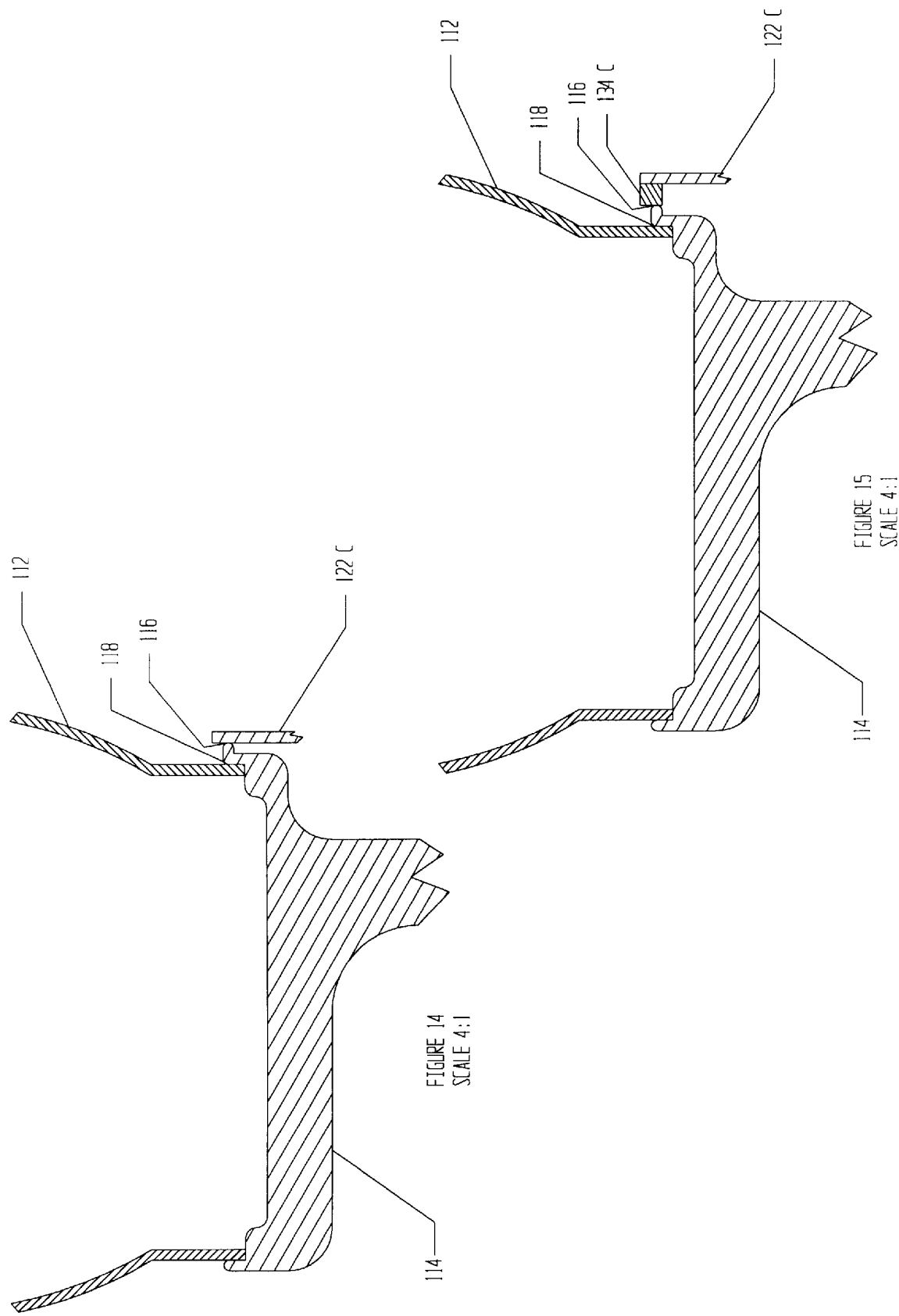

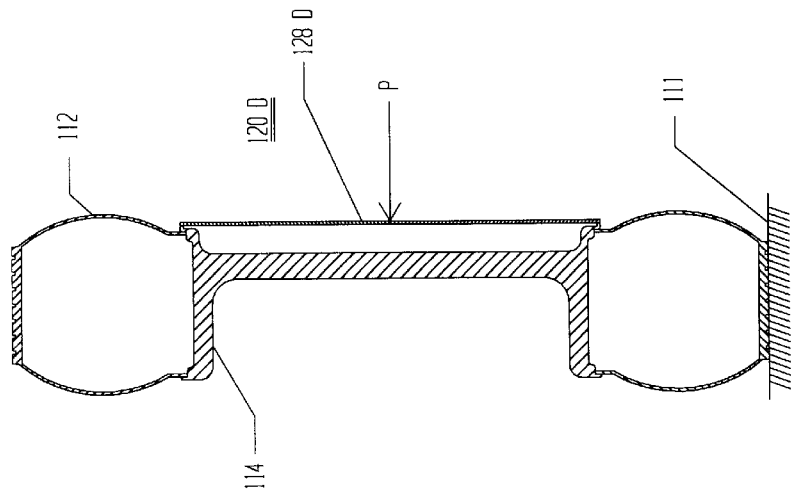
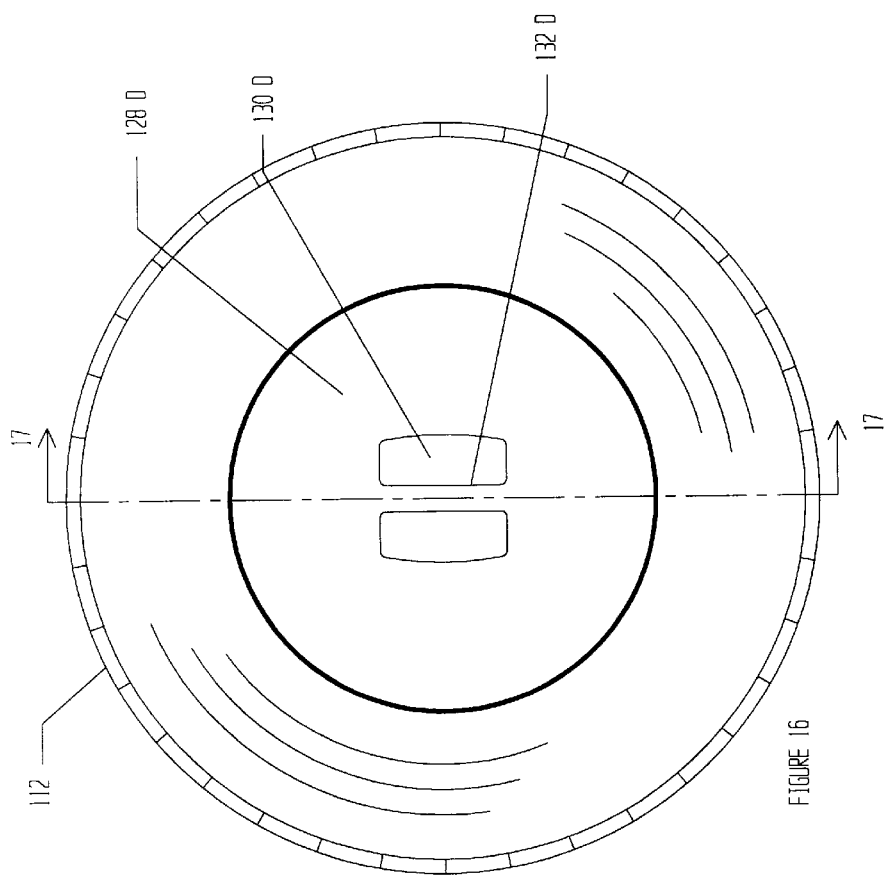

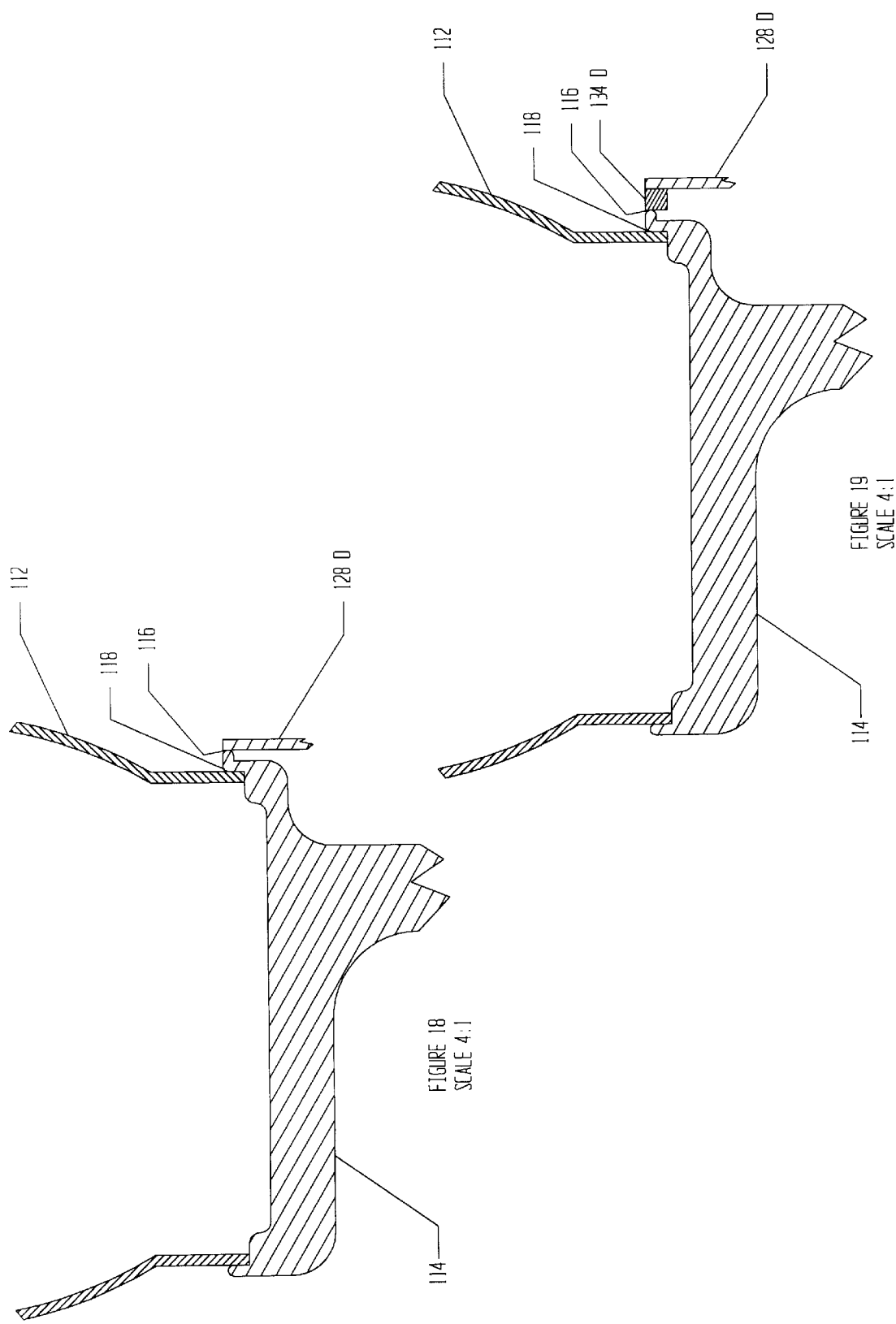

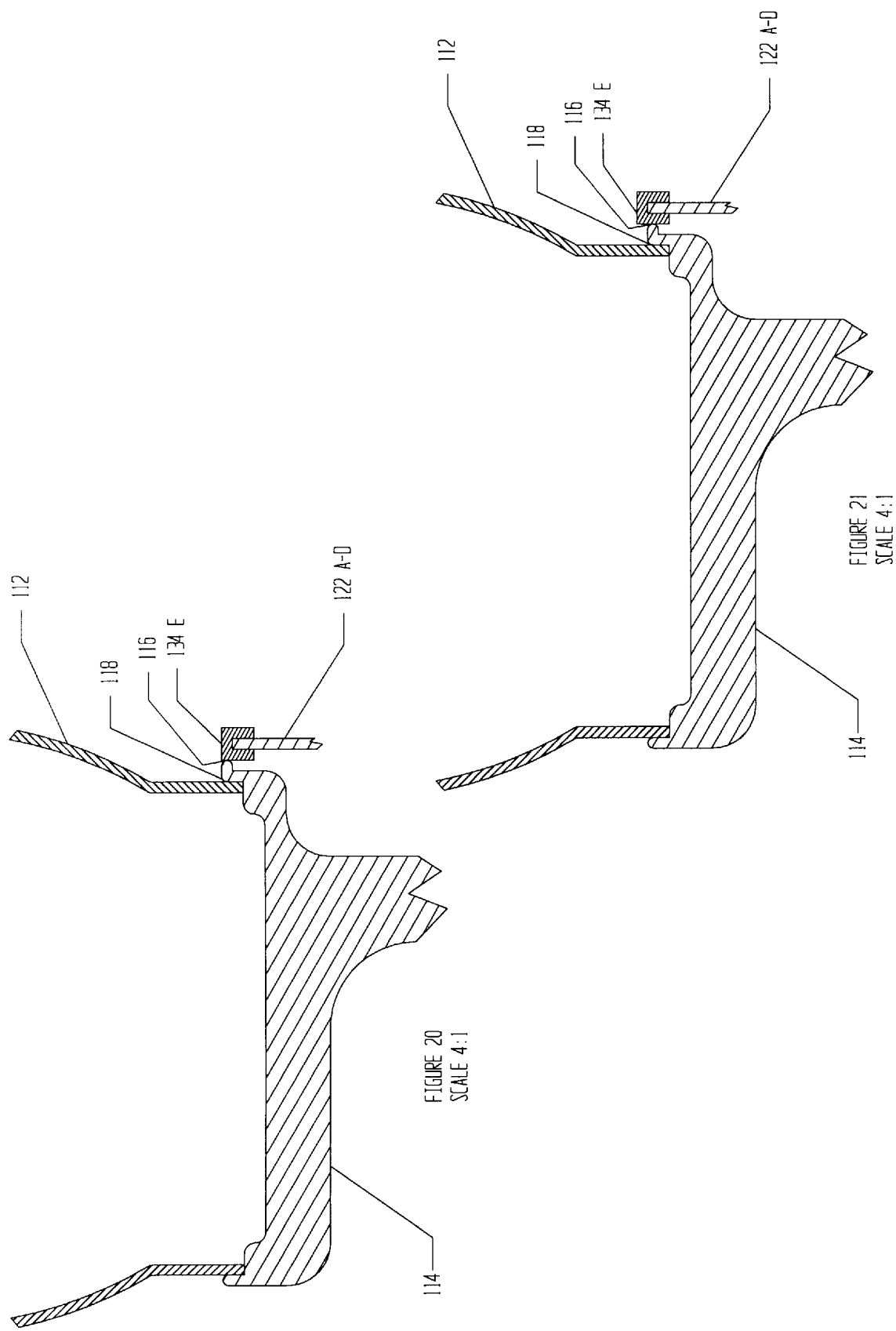

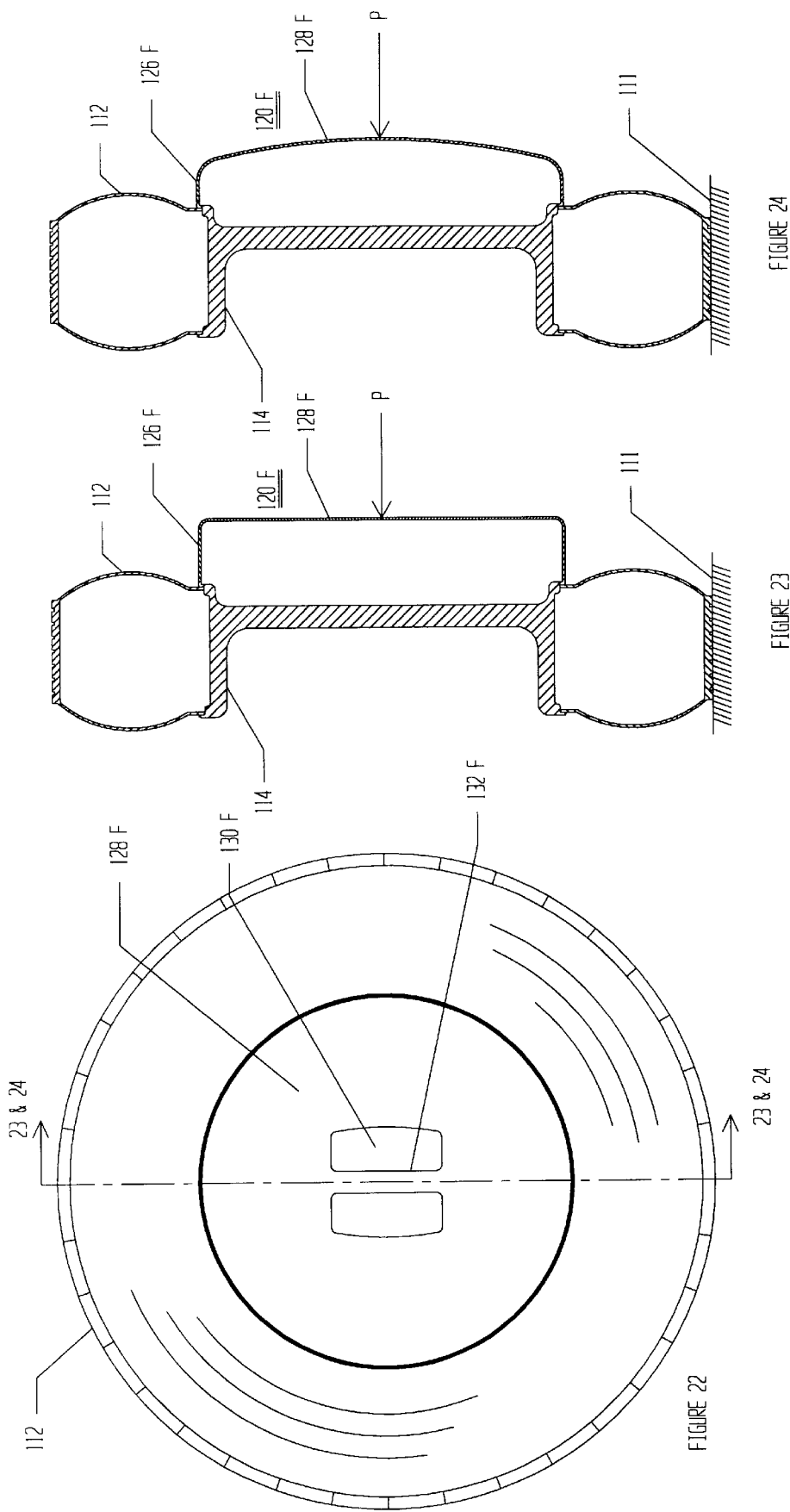

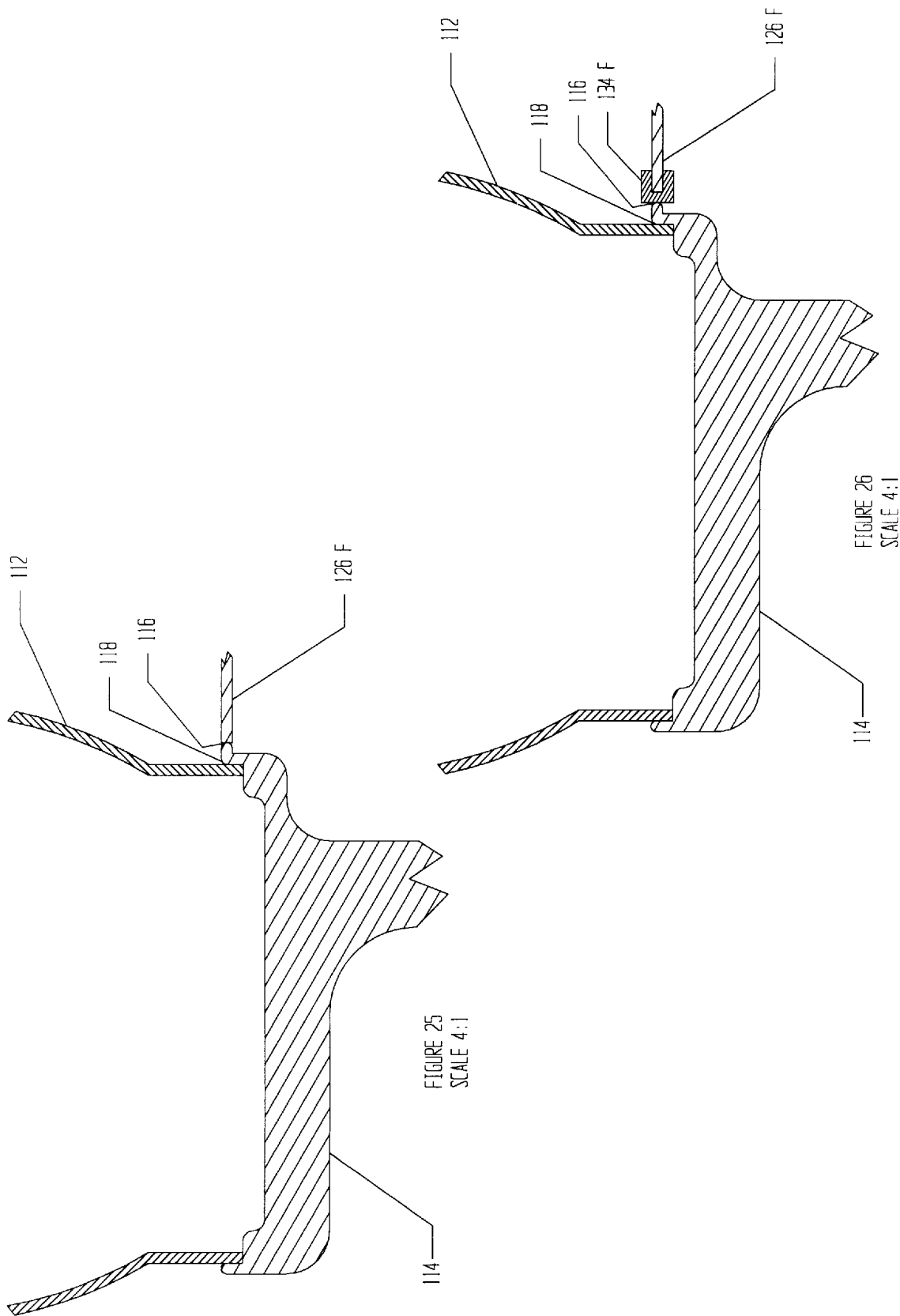

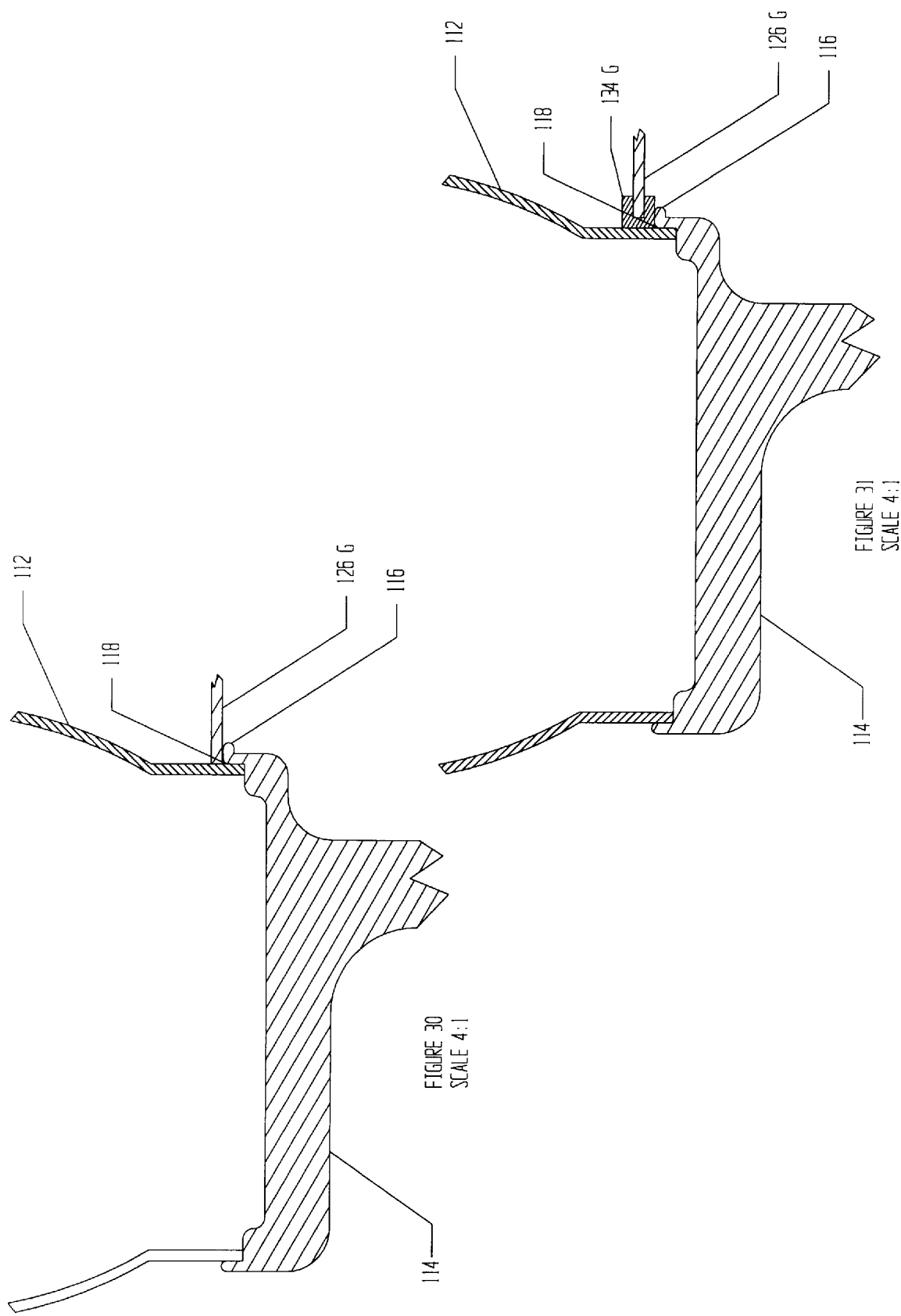

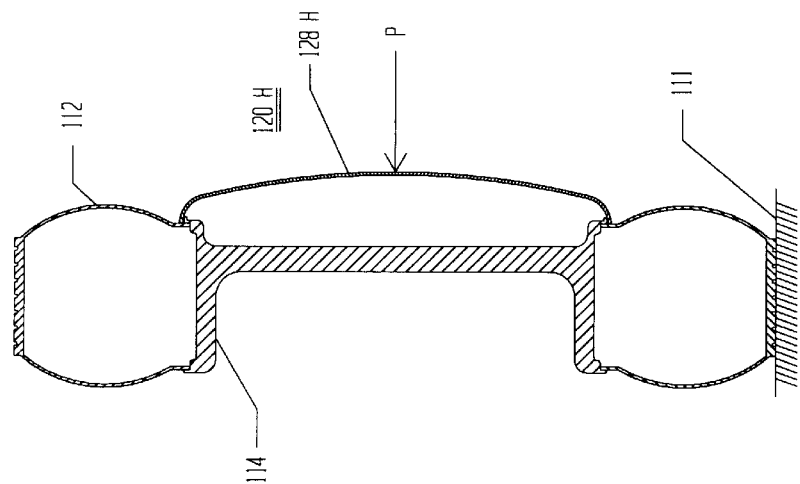
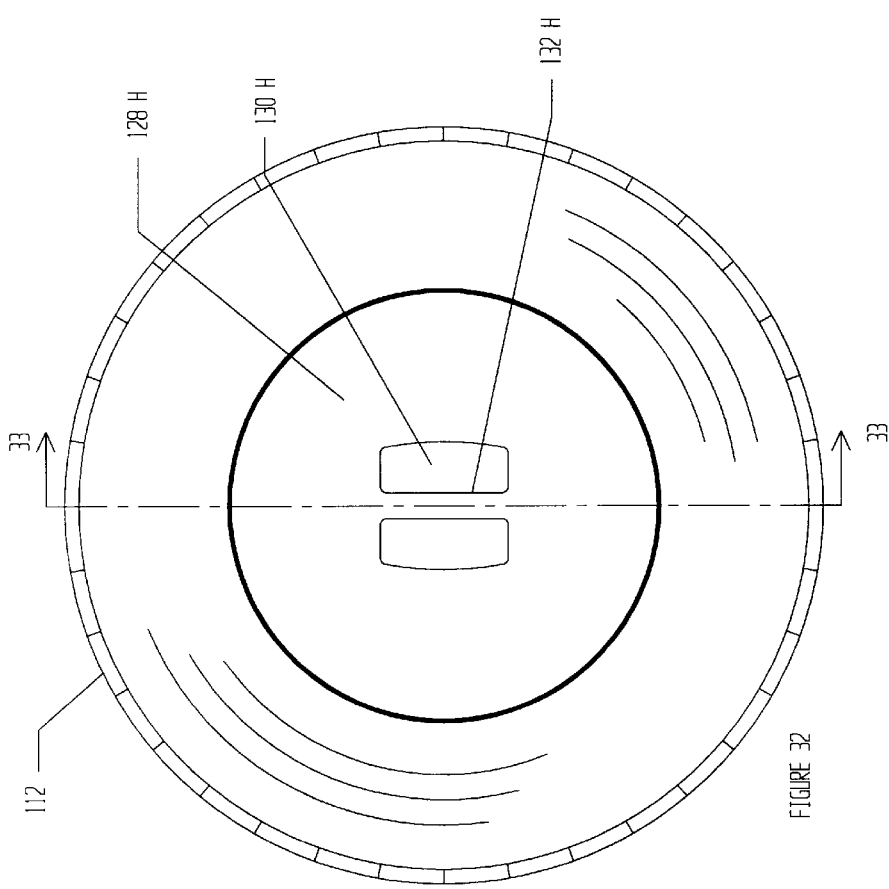

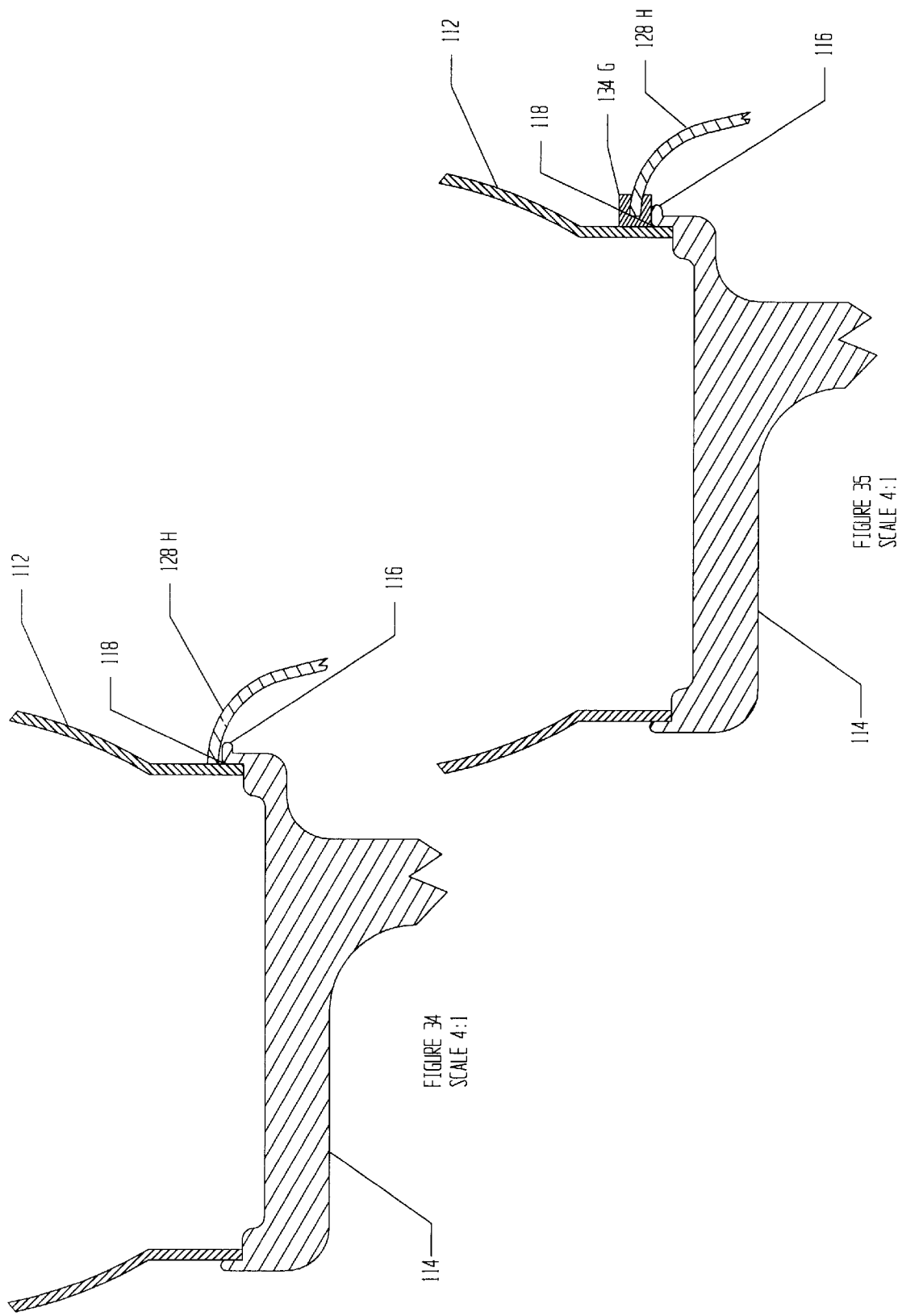

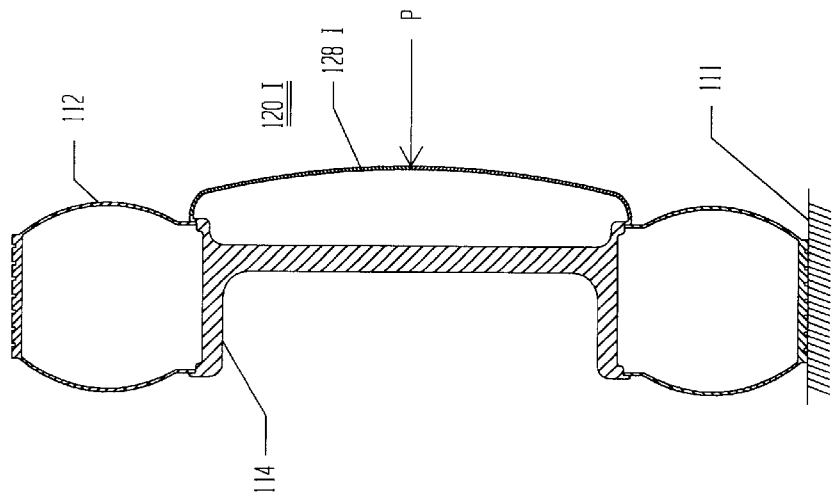
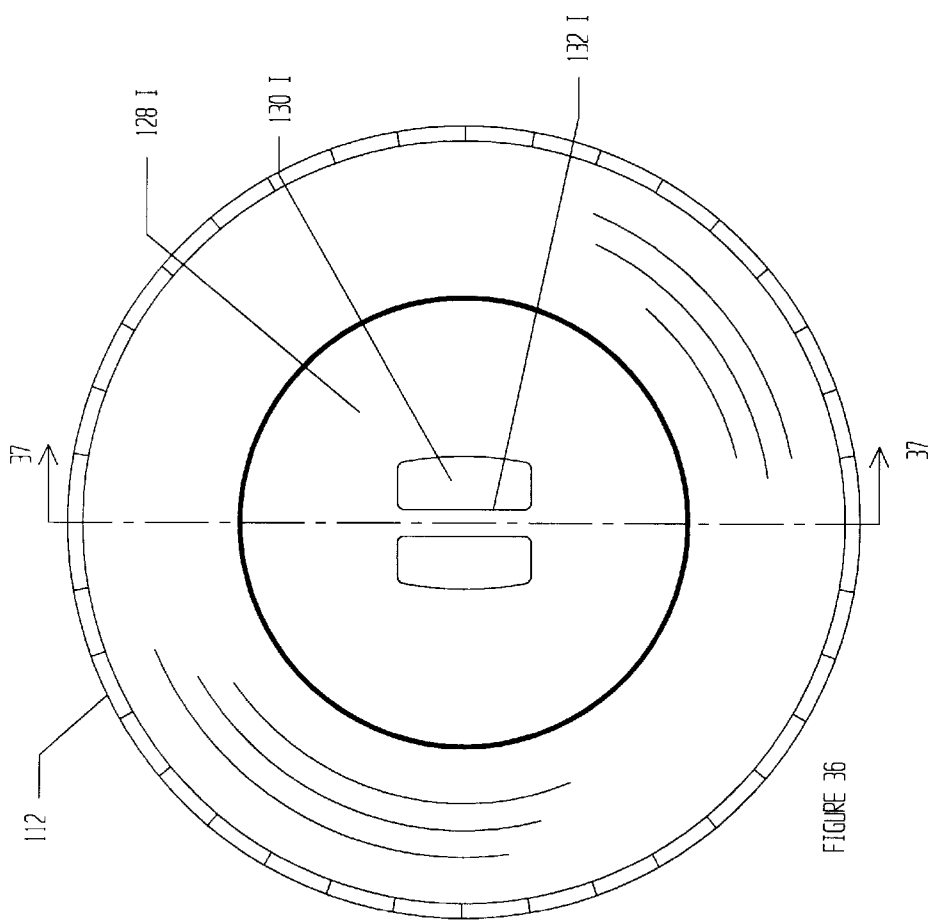

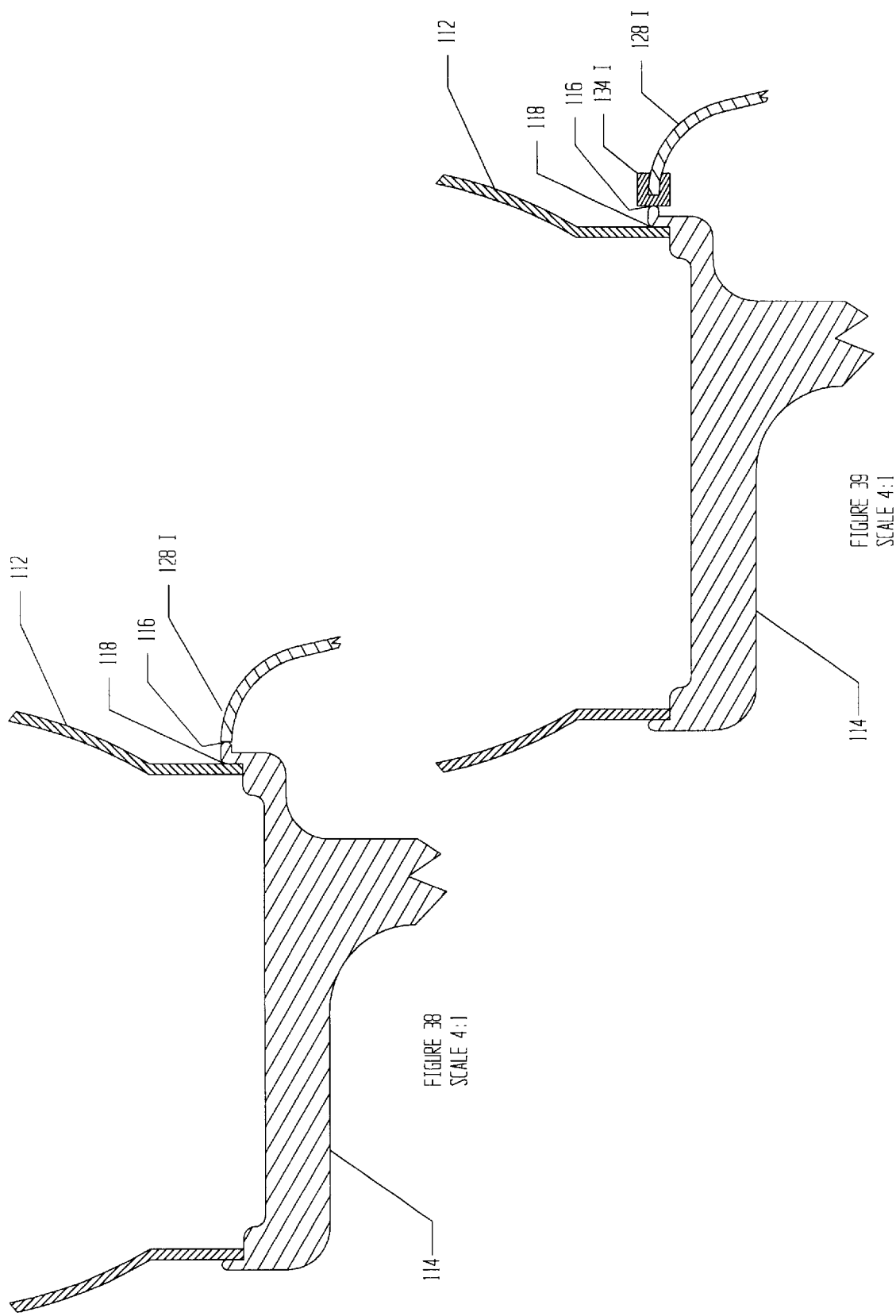

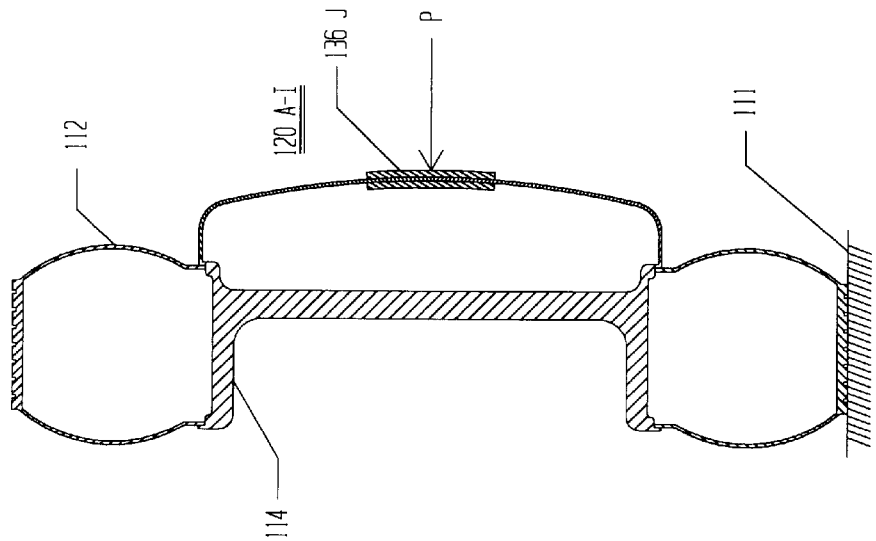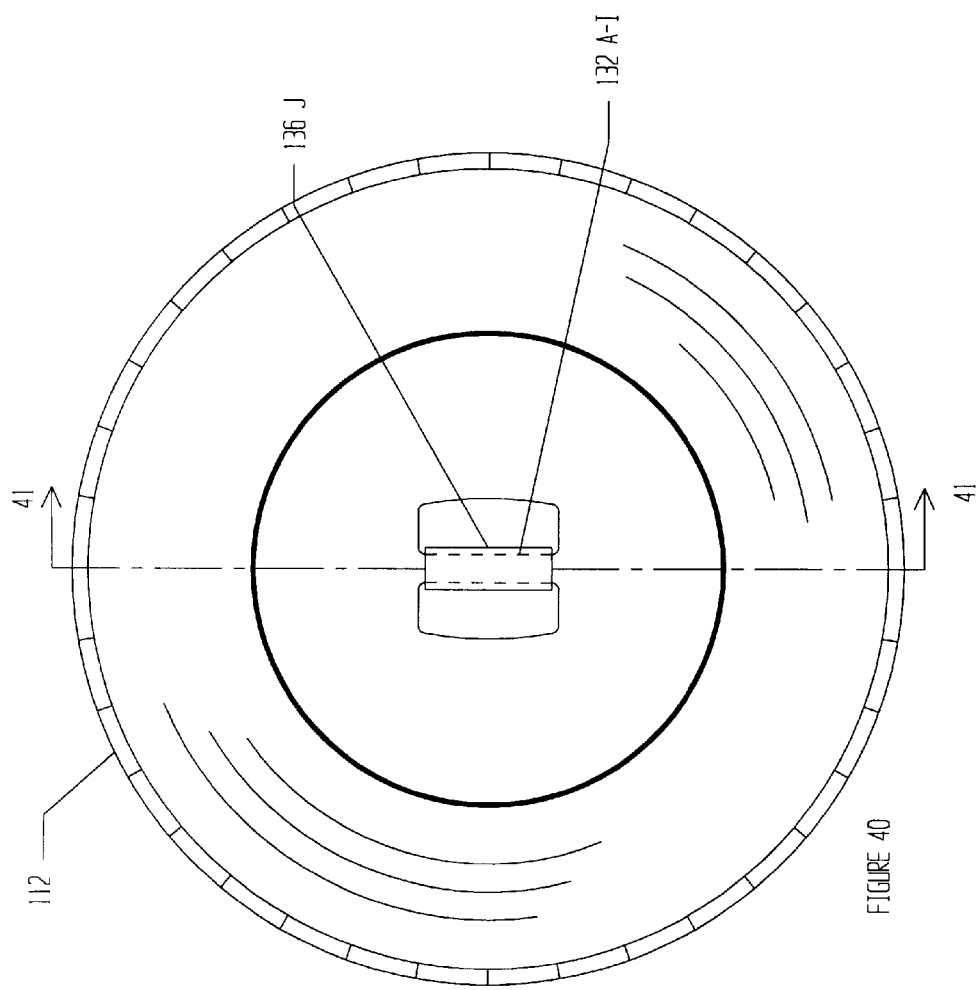

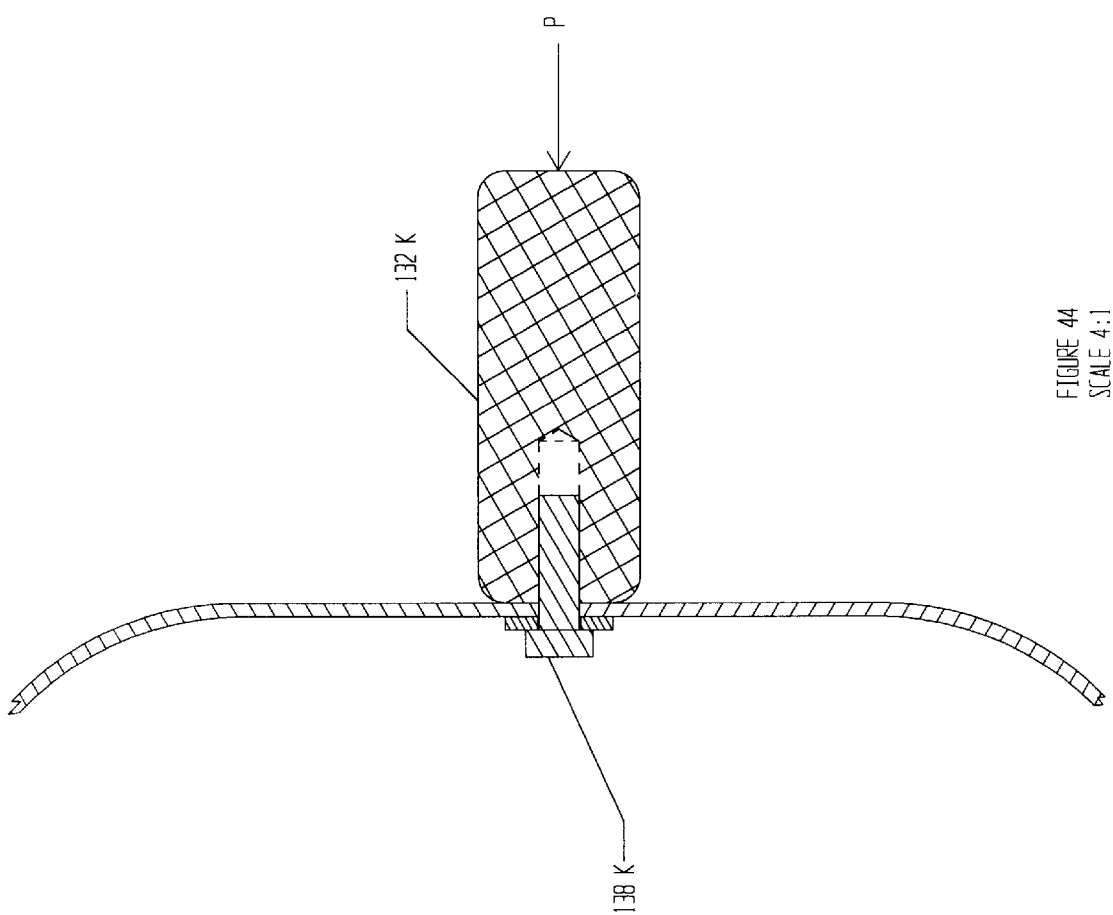

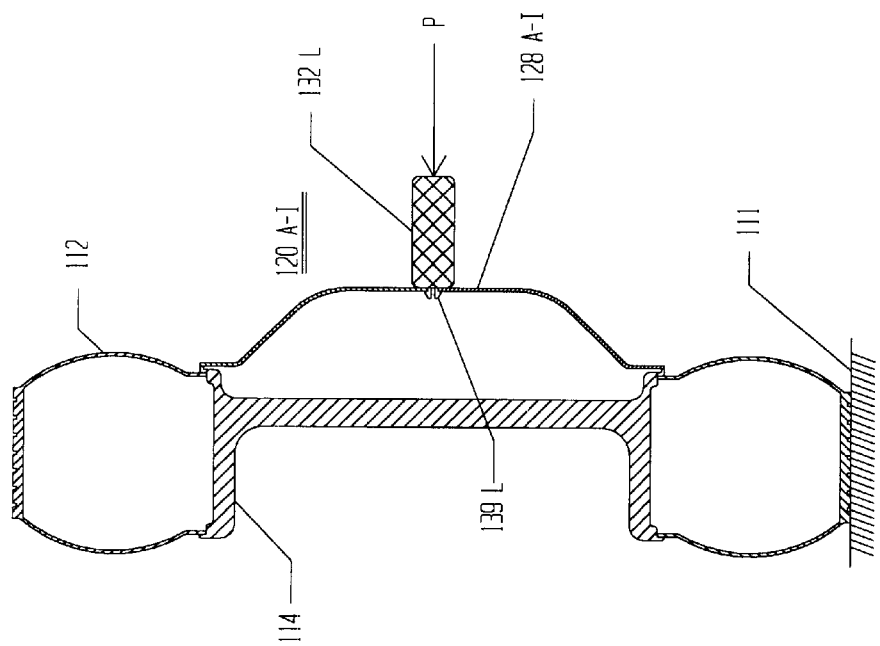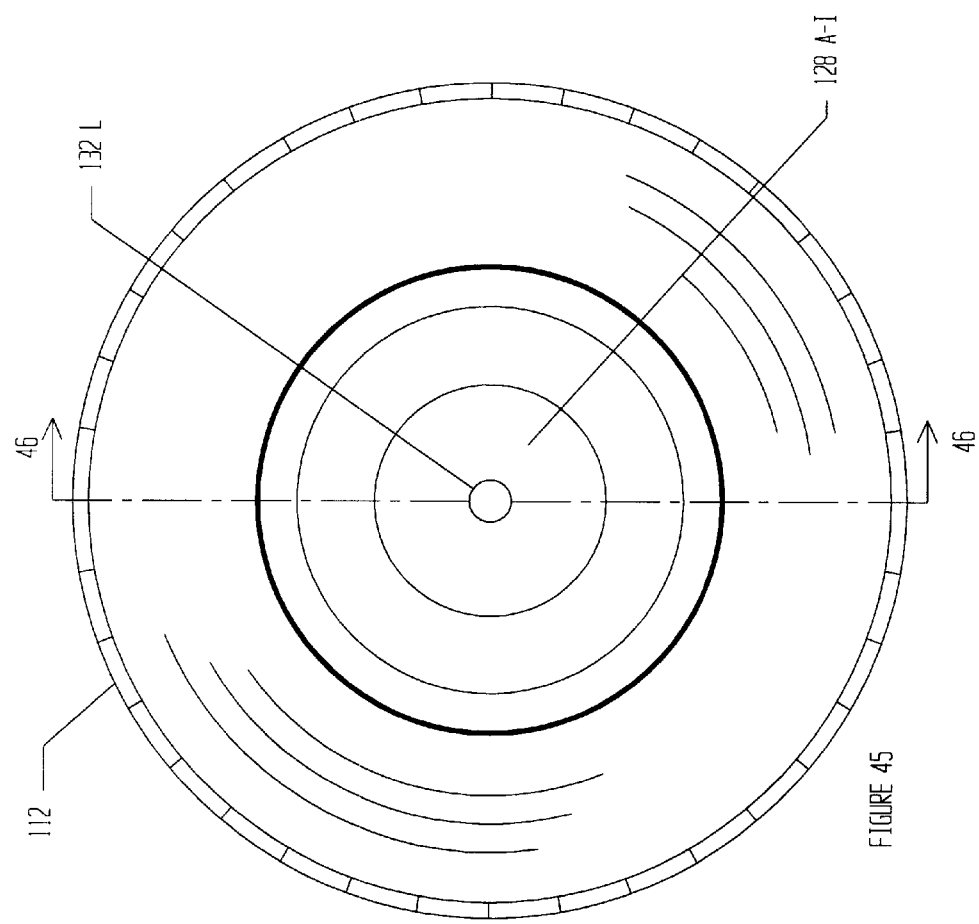

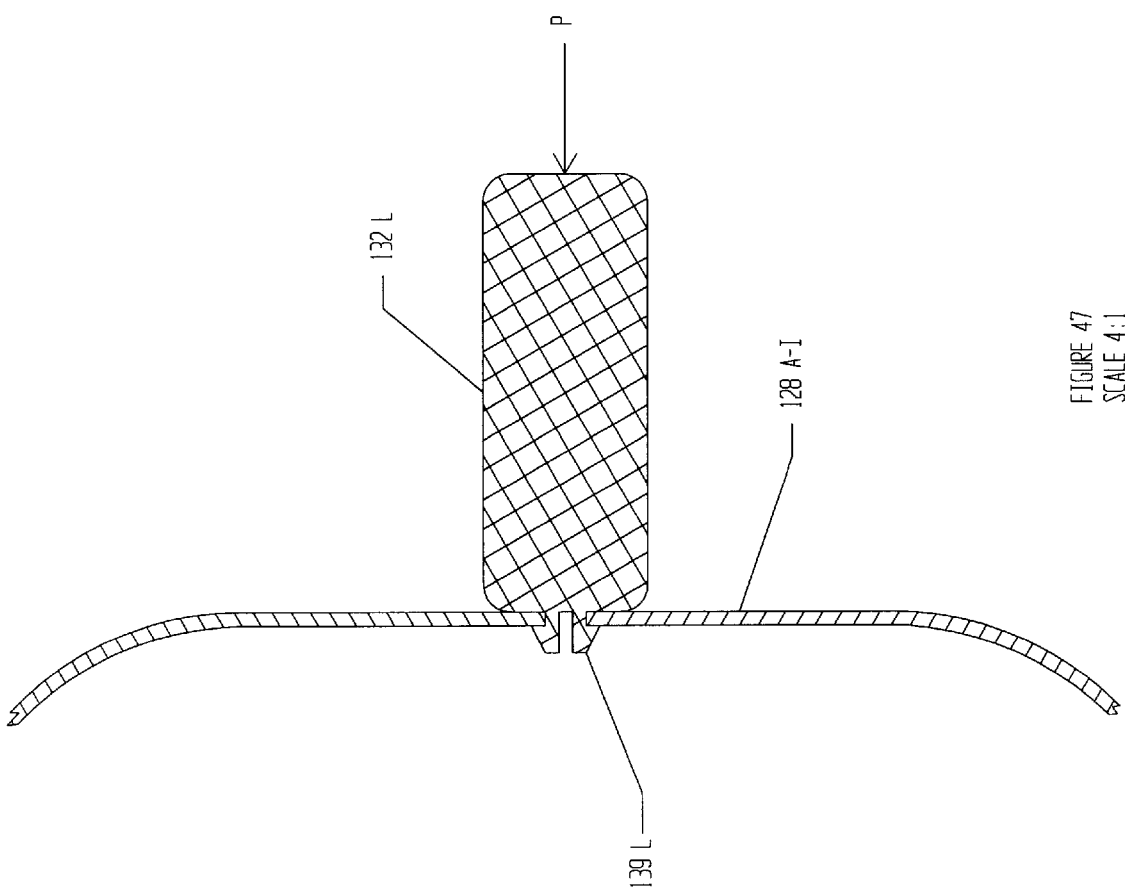

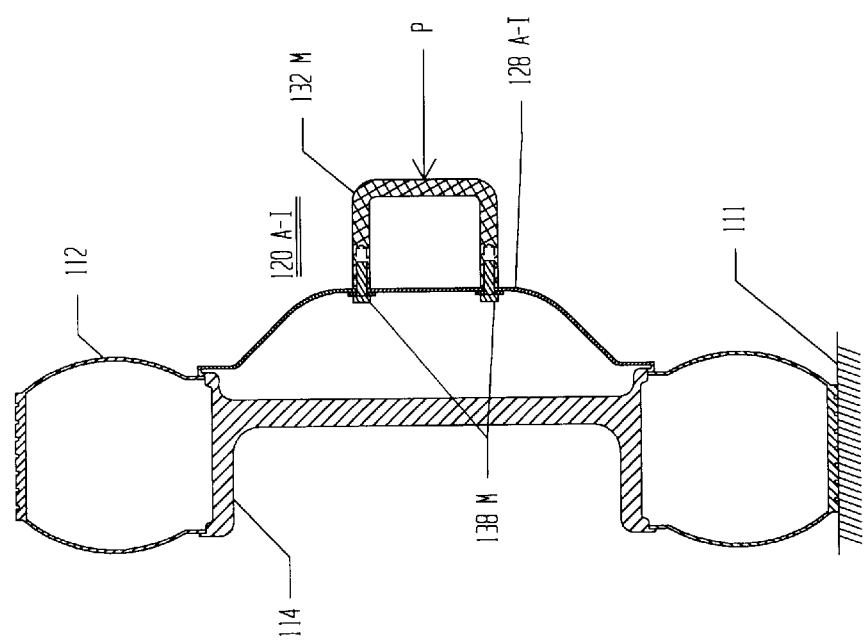
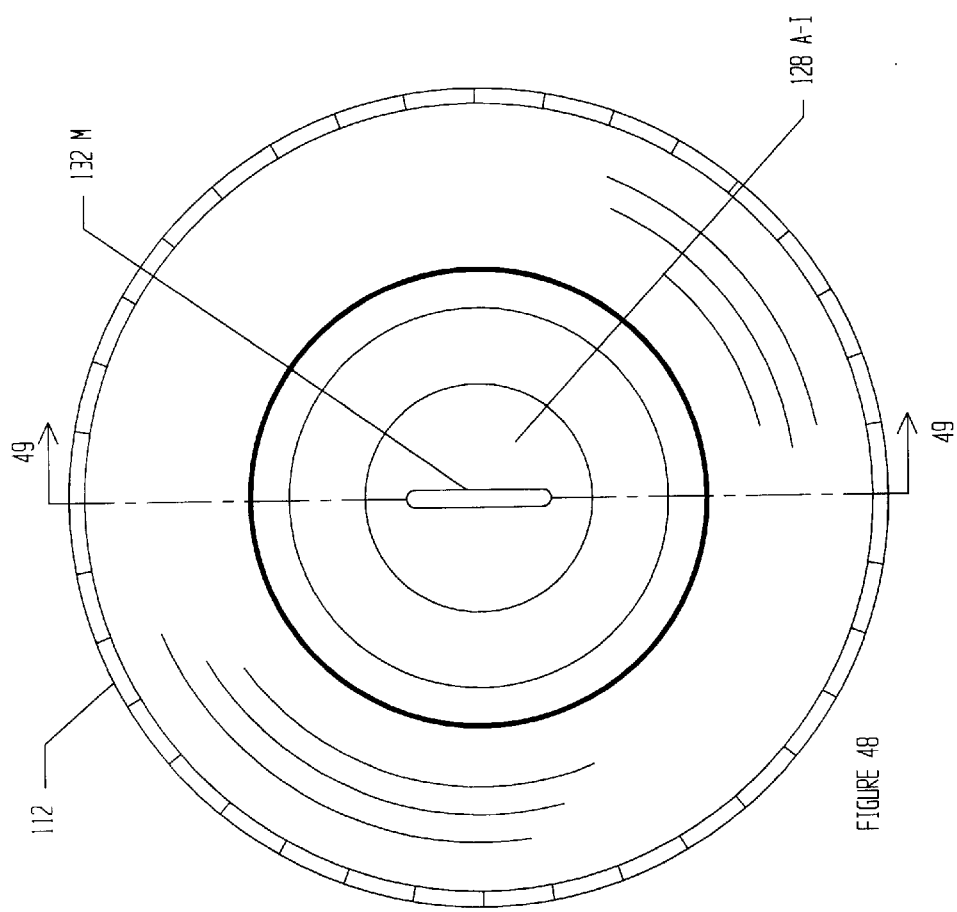

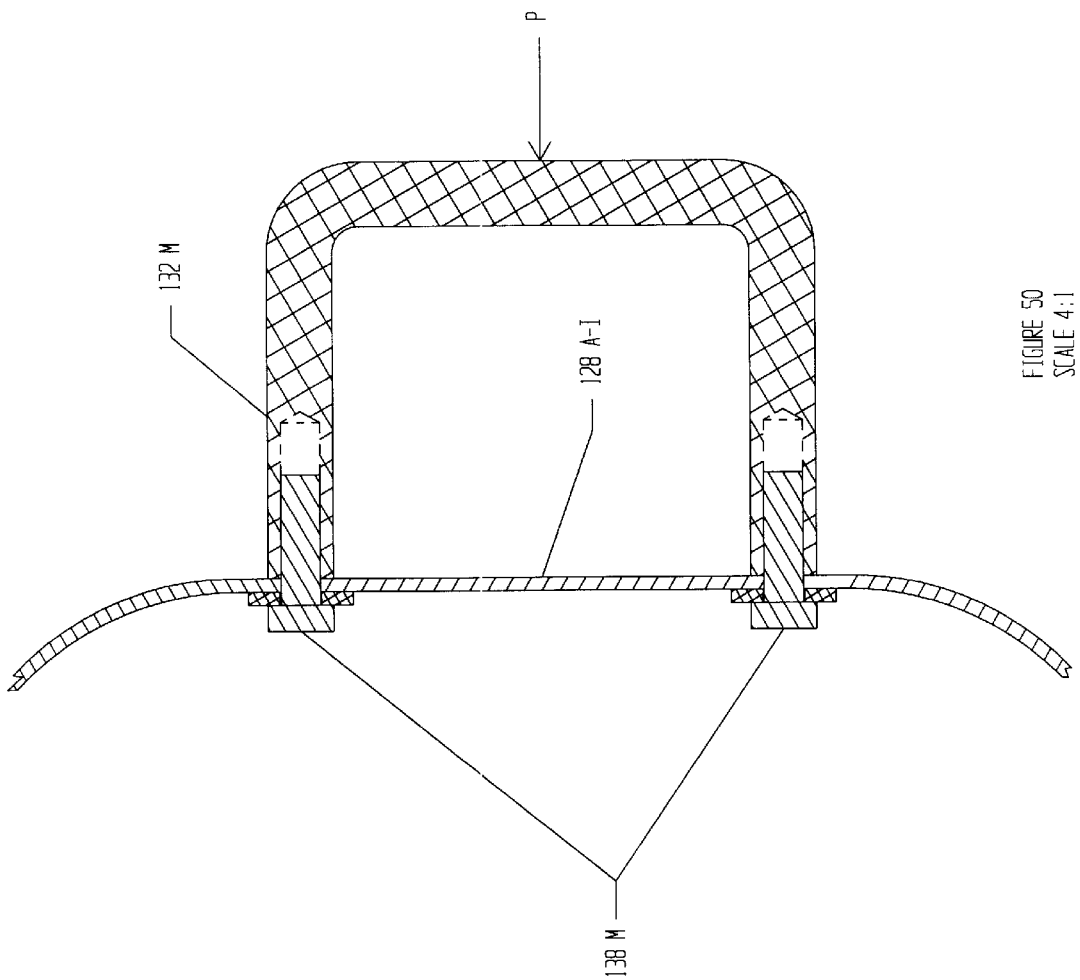

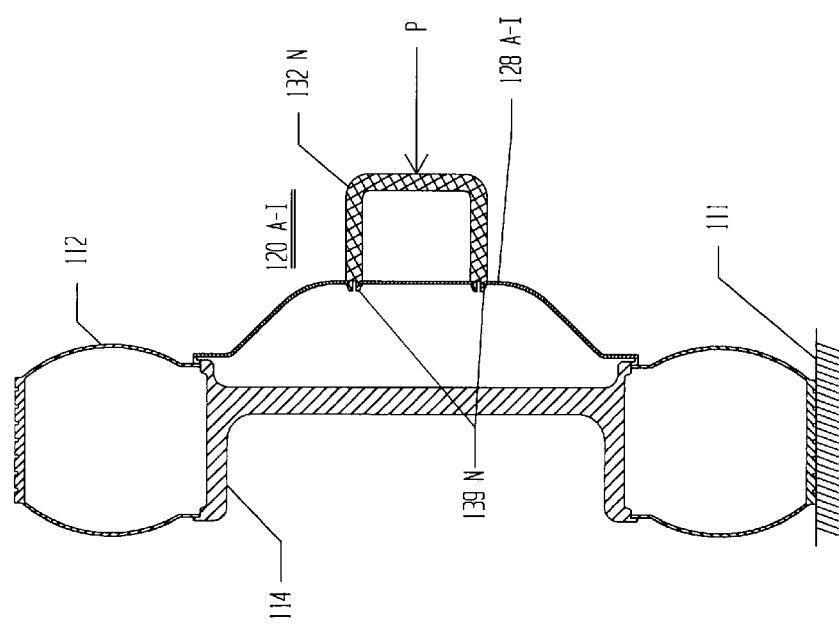
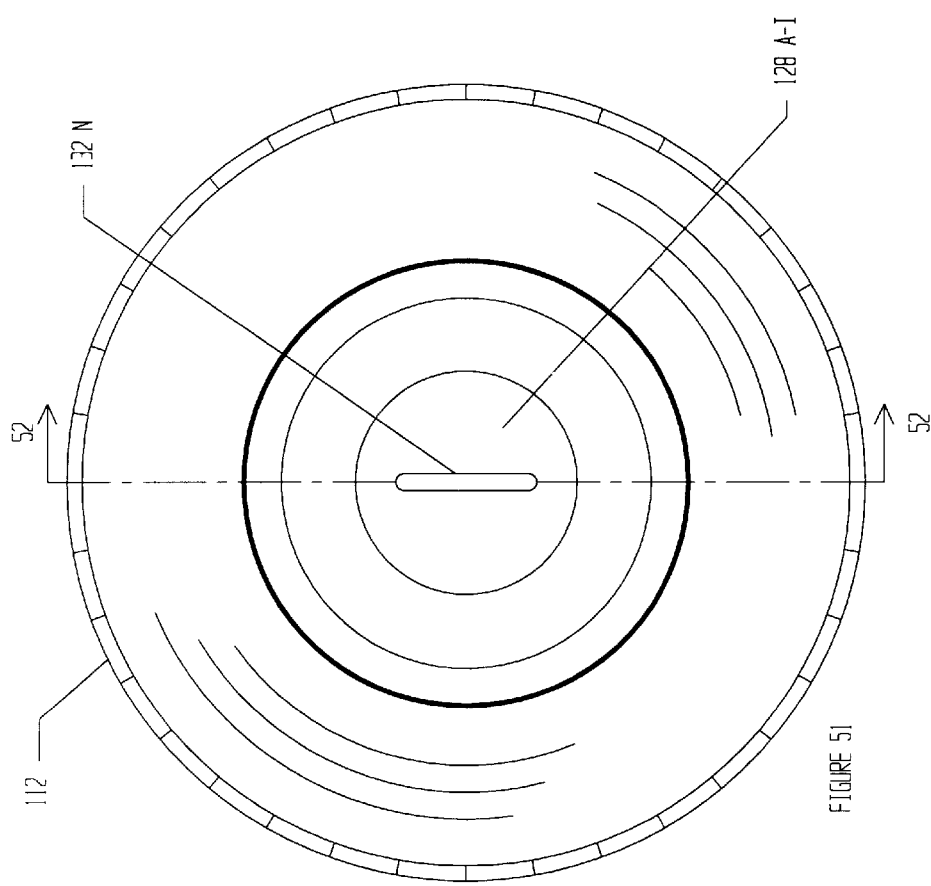

SCALE 4:1

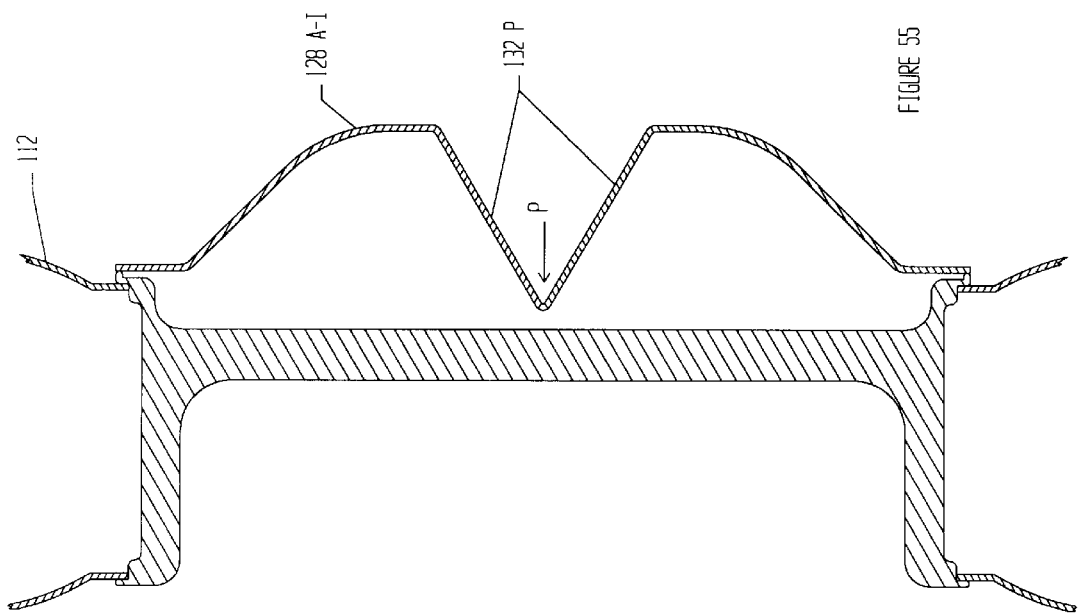
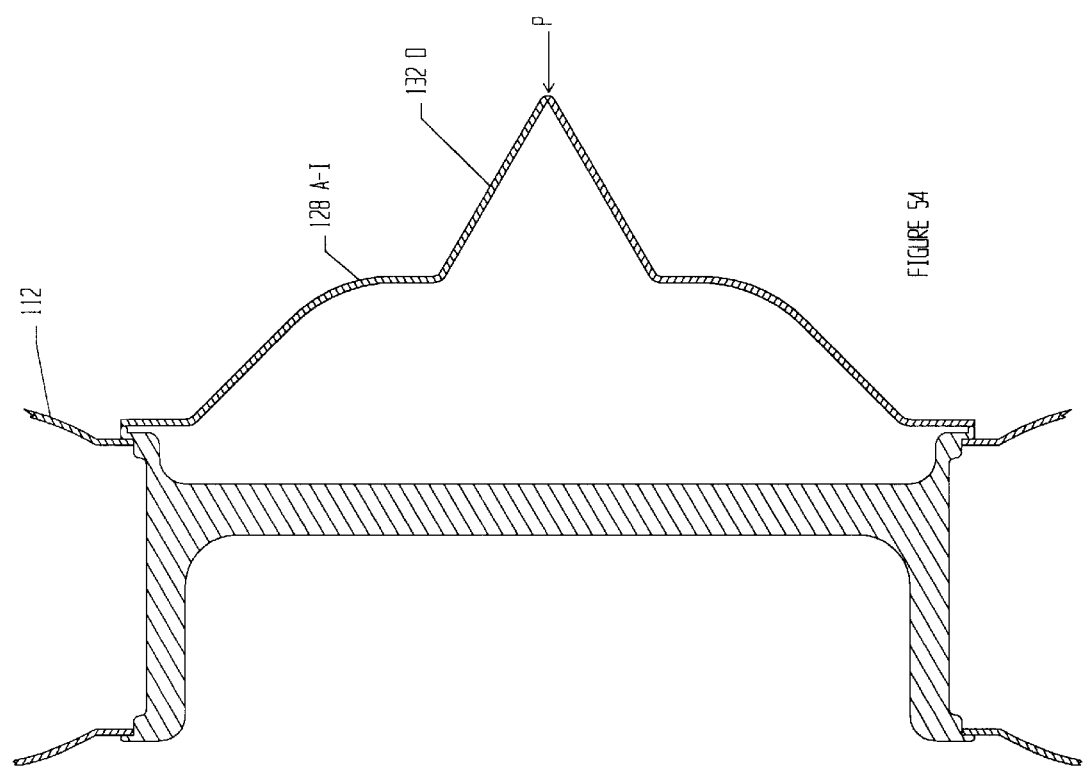

VEHICLE WHEEL MASK FOR PROTECTION OF WHEEL'S FINISH WHEN DETAILING AND APPLYING CHEMICAL TREATMENTS TO TIRES

This patent application is related to disclosure document No. 452735 filed on Mar. 8, 1999

BACKGROUND—FIELD OF THE INVENTION

This invention relates to devices used in vehicle detailing. More particularly to devices used to mask or shield vehicle wheels and wheel covers while tire dressings, cleaners or other protectants are applied to the vehicle tire.

BACKGROUND OF THE INVENTION— DISCUSSION OF PRIOR ART

This invention relates generally to wheel protection and more particularly, to a device for protecting a vehicle wheel while it's tire is being chemically treated.

Trucks and cars represent a substantial investment by their respective owners. Often to enhance the appearance or otherwise personalize these vehicles, the owner may choose to order special factory wheels or purchase specialty aftermarket wheels from one of many wheel distributors. These specialty wheels can represent a financial outlay reaching into the thousands of dollars. Like purchasing a new suit, it is not complete without a set of matching polished shoes, or tires in this case. The selection of the tires are often as equally as important as the wheels. The tires and wheels together are viewed by the owner as a "matched set", in his eyes.

These vehicle owners then go about the ritual, often many times in the span of a week, of keeping the vehicles looking their best. Many products are available to aid in the washing and polishing of the vehicle. Yet this job is not complete without much attention and labor being directed at the cleaning, polishing and otherwise enhancing the appearance of those tires and wheels. The vehicle owner can easily spend as much time on the wheels and tires as he does on the rest of the vehicle, largely due to the deep black luster and that he desires from those wheels and wheel covers.

Generally after the vehicle owner has spent a considerable amount of time and intense intricate labor caring for the wheel by cleaning and polishing, he then directs his attention towards the tires. Vehicle owners like to keep the their tires looking like new . . . even better than new! Many vehicles have whitewall tires, while others mount all-black tires. The white portions of the tires can become quite dirty with vehicle use, because of brake dust, dirt and road tar. The black portion of the new tires have a deep black luster which is difficult to maintain. There are many products out on the market to guard against oxidation and ultraviolet rays which tend to fade, harden and crack the side-walls of the tire and restore or improve that rich black luster of the tires. A high gloss deep black finish on the tire side-wall complements those custom wheels or even OEM wheels completes the ensemble.

Whether the owner is trying to protect the tire or trying to achieve that shine, or both, the chemicals needed are generally liquid and are purchased or applied in spray bottles. It is desirable to be able to apply these products to the tire with a spray dispenser, which helps ensure even coverage as well as offering a substantial time savings when compared to applying these products by hand using a towel and wiping the product onto the side-wall of the tire.

The problem with spraying the chemical protectants or the appearance enhancing solution is that extreme care must be taken not to allow any of the solution onto the finish of the wheel. This solution, upon drying or while still wet will leave smudges, that will dull the finish, attract more dirt and brake dust, and even do permanent damage by pitting the wheel's finish.

Devices have been developed to protect vehicle wheels during chemical tire treatment. Some of these are shown in U.S. Pat. Nos. 4,792,191; 4,784,440; 4,811,991; 4,874,206; 4,955,670; 5,524,972 and 5,785,389.

U.S. Pat. No. 4,792,191 requires an assembly method in order to use that requires placing tabs in slots to change the device from one size to another, which will be complicated for an end user and not desirable.

U.S. Pat. No. 4,784,440 relies on a potentially costly snap feature to detachably attach this device to the vehicle wheel. This feature is overly complex and is subject to failing easily if made from plastic, could damage the wheel or tire if made from metal and overall, it requires extra effort and time to install on and remove from each wheel by the operator.

U.S. Pat. No. 4,811,991 relies on a complex interface feature and clearance with the outside diameter of the wheel and tire sidewall making this a difficult device to use.

U.S. Pat. No. 4,874,206 relies upon a snap feature to releasably secure the device to the vehicle wheel. This device also relies on many concentric rings to allow for other size wheels, thus increasing the complexity, fragility, cost, in addition, there is high probability that it may not be usable on larger wheel sizes due to the snap features it retains for smaller size wheels. This product will be difficult to install and use.

U.S. Pat. No. 4,955,670 relies upon straps and hooks to releasably secure the device to the vehicle wheel. These hooks and straps will be time consuming, cumbersome and difficult to install. This device also relies on a plurality of concentric rings to allow for other size wheels, which the operator will have to cut off to achieve his specific wheel size, subjecting him to risk of injury. This device with it's plurality of sizes incorporated into one unit will be costly and difficult to manufacture, with no real benefit to the end user with multiple sizes of wheels . . . he would still need to purchase another.

U.S. Pat. No. 5,524,972 relies on a plurality of concentric rings to allow for other size wheels, which the operator will have to cut off to achieve his specific wheel size, subjecting the user to risk of injury. This device with it's plurality of sizes incorporated into one unit will be costly and difficult to manufacture, with no real benefit to the end user with multiple sizes of wheels . . . he would still need to purchase another.

U.S. Pat. No. 5,785,389 only covers a small portion of the vehicle wheel, leaving a great portion of the wheel unprotected.

While all of these devices are directed toward wheel protection while detailing tires, none have found commercial success. This may be due to the fact that they do not adequately mask and protect the wheel wheel cover or are unduly complex, are not engineered for a full range of wheel sizes, are bulky and cumbersome to be used easily, require assembly and some even pose risk to the user by instructing the user that a knife must be used to cut the part in order to achieve a desired size. In all, none of these prior devices have combined function, simplicity, ease of operation and low cost to truly address the needs of the market and the end user.

A simple, low cost and effective product is needed on the market that will protect the wheel or wheel cover while the owner is applying these chemical protectants or appearance enhancing solutions to the tire side-wall. With the protection of the wheel or wheel cover while the owner is spraying or otherwise applying chemicals to the tire, the owner can quickly and easily complete this task in a just a few minutes, making the owner more likely to perform this task on a more regular basis.

SUMMARY OF THE INVENTION

This hand-held vehicle wheel spray mask for tire detailing would be held against the vehicle wheel while a tire dressing or protectant is applied to the tire. This device is comprised of a generally concave shaped or generally cylindrical shaped enclosure device that approximately matches or is slightly greater than the vehicle wheel diameter. This device will sufficiently cover the vehicle wheel while providing adequate axial clearance with protrusions from the vehicle wheel such as knock-offs, hubs or the unique shape of the wheel itself. This vehicle wheel clearance feature of the enclosure would be defined as a generally flat or domed concave surface that is on the opposite end of the mask with respect to the interface with the vehicle wheel. Since such a mask by definition approximately matches the diameter of a given vehicle wheel, a series of predetermined unique and separate wheel masks are required to address the many sizes of vehicle wheels in the market.

This vehicle wheel spray mask for tire detailing could also be comprised of a flat disc that approximately matches the diameter of the vehicle wheel that would be sufficient for most OEM and many after-market vehicle wheels that do not have large axial protrusions from the wheel.

Without regard for the particular shape, the vehicle wheel spray mask for tire detailing would incorporate a handle, for gripping, maneuvering and holding the wheel mask in place against the vehicle wheel. This handle could be centrally located on the part, on the generally flat or domed concave surface that is on the opposite end of the part with respect to interface surface with the vehicle wheel. This handle could be attached, in the form of a separate piece, cut or formed integrally into the flat or domed concave surface, molded outwardly or inwardly from the base material of this flat surface or domed concave surface.

Therefore, it is an object of this invention to provide a hand held device to mask and protect wheels during chemical treatment of a tire and tire sidewall that is mounted on a wheel, that is inexpensive, effective, easy to use, engineered to have unique and separate sizes for all wheel sizes.

OBJECTS AND ADVANTAGES

Accordingly, it is therefore an object of this invention to provide a hand held device to mask and protect wheels during chemical treatment of a tire and tire sidewall that is inexpensive, effective, simple to use, engineered to have unique and separate sizes for all wheel sizes and most importantly, a product that is offered to the public for sale at a reasonable cost. Several other objects and advantages of the present invention are:

a) to provide a vehicle wheel mask or shield that is lightweight and easy to hold in one hand with no other means necessary for holding it in place, freeing the other hand to apply the generally liquid protectants or tire dressing.

b) to provide a vehicle wheel mask or shield that is durable and not subject to failure or loss of latching mechanisms.

c) to provide a simple but reliable interface detail that will provide an adequate barrier against overspray, thus protecting the vehicle wheel or wheel cover.

d) to provide a vehicle wheel mask that is simple to use, be cost efficient and most of all, be effective in masking the wheel or wheel cover.

e) to provide a vehicle wheel mask that is completely ready for use by the end user, with no additional assembly or any other modification required.

f) to provide a vehicle wheel mask that will make use of readily available recycled materials where possible; such as an ABS material incorporating reground materials.

g) to provide a vehicle wheel mask that could incorporate a cushioned handle or grip for the comfort of the user.

h) to provide a vehicle wheel mask that could incorporate a seal that could be added to the wheel mask at the wheel interface for additional protection of the vehicle wheel as well as to aid in the placement of the wheel mask against the wheel. The seal would not absorb any of the applied liquid products and could be simply wiped off before moving to the next tire if needed, eliminating the chance for inadvertent transfer of protectants dripping on the wheel.

Still further objects and advantages will become apparent from a consideration of the ensuing description and drawings.

DRAWING FIGURES

In the drawings, closely related figures have the same number but different alphabetic suffixes.

FIGS. 2–5 show various aspects of one style of wheel mask with an interface flange, a generally flat or domed shaped body with an integral handle or handgrip, and two interface methods with the vehicle wheel, with and without a gasket or seal.

FIGS. 6–10 show various aspects of another style of wheel mask that utilizes a cylindrical walled body in conjunction with the interface flange.

FIGS. 11–15 show various aspects of another style of wheel mask with an interface flange that is slightly greater in diameter than the vehicle wheel.

FIGS. 16–19 show various aspects of a very simplistic style of wheel mask and its interface feature.

FIGS. 20 & 21 show various aspects of a two methods of seals or gaskets about the outer diameter of the flange interface feature.

FIGS. 22–26 show various aspects of another style of wheel mask that utilizes a cylindrical walled edge interface feature that mates against the face of the wheel, generally flat or domed shaped, with and without a gasket or seal.

FIGS. 27–31 show various aspects of another style of wheel mask that utilizes a cylindrical walled edge interface feature that mates against the tire concentrically adjacent to the outer diameter of the wheel, generally flat or domed shaped, with and without a gasket or seal.

FIGS. 32–35 show various aspects of another style of wheel mask that utilizes a generally concave walled edge interface feature that mates against the tire concentrically adjacent to the outer diameter of the wheel, generally concave or domed shaped, with and without a gasket or seal.

FIGS. 36–39 show various aspects of another style of wheel mask that utilizes a concave walled edge interface feature that mates against the face of the wheel, generally flat or domed shaped, with and without a gasket or seal.

FIGS. 40–41 illustrate the addition of cushioned material to a handle for improved operator comfort.

FIGS. 42–44 illustrate various aspects of another style of a handle or handgrip that is cylindrical in shaped, protruding axially outwardly, that is separately attached with bolts.

FIGS. 45–47 illustrate various aspects of another style of a handle or handgrip that is cylindrical in shaped, protruding axially outwardly, that is attached with a snap feature.

FIGS. 48–50 illustrate various aspects of another style of a handle or handgrip that is generally u-shape, protruding axially outwardly, that is separately attached with bolts.

FIGS. 51–53 illustrate various aspects of another style of a handle or handgrip that is general u-shaped, protruding axially outwardly, that is attached with a snap feature.

FIG. 54 illustrates various aspects of another style of a handle or handgrip that is integrally molded into the generally concave surface, protruding axially outward from the mask and wheel.

FIG. 55 illustrates various aspects of another style of a handle or handgrip that is integrally molded into the generally concave surface, protruding axially inward from the mask and wheel.

REFERENCE NUMERALS IN DRAWINGS

| | |
|---|---|
| 110 | vehicle |
| 111 | ground or pavement |
| 112 | tire |
| 114 | wheel |
| 115 | owner/operator |
| 116 | face of wheel |
| 117 | spray bottle |
| 118 | annular crevice formed by wheel and tire |
| 120 | wheel mask |
| 122 | flange |
| 126 | cylindrical wall |
| 128 | generally flat or domed concave body enclosure |
| 130 | holes or slots |
| 132 | handle or handgrip |
| 134 | seal or gasket |
| 136 | cushioned handgrip/covering |
| 138 | hardware (bolt/washer) |
| 139 | snap feature |

DETAILED DESCRIPTION
FIGS. 1–56

Figure 1:
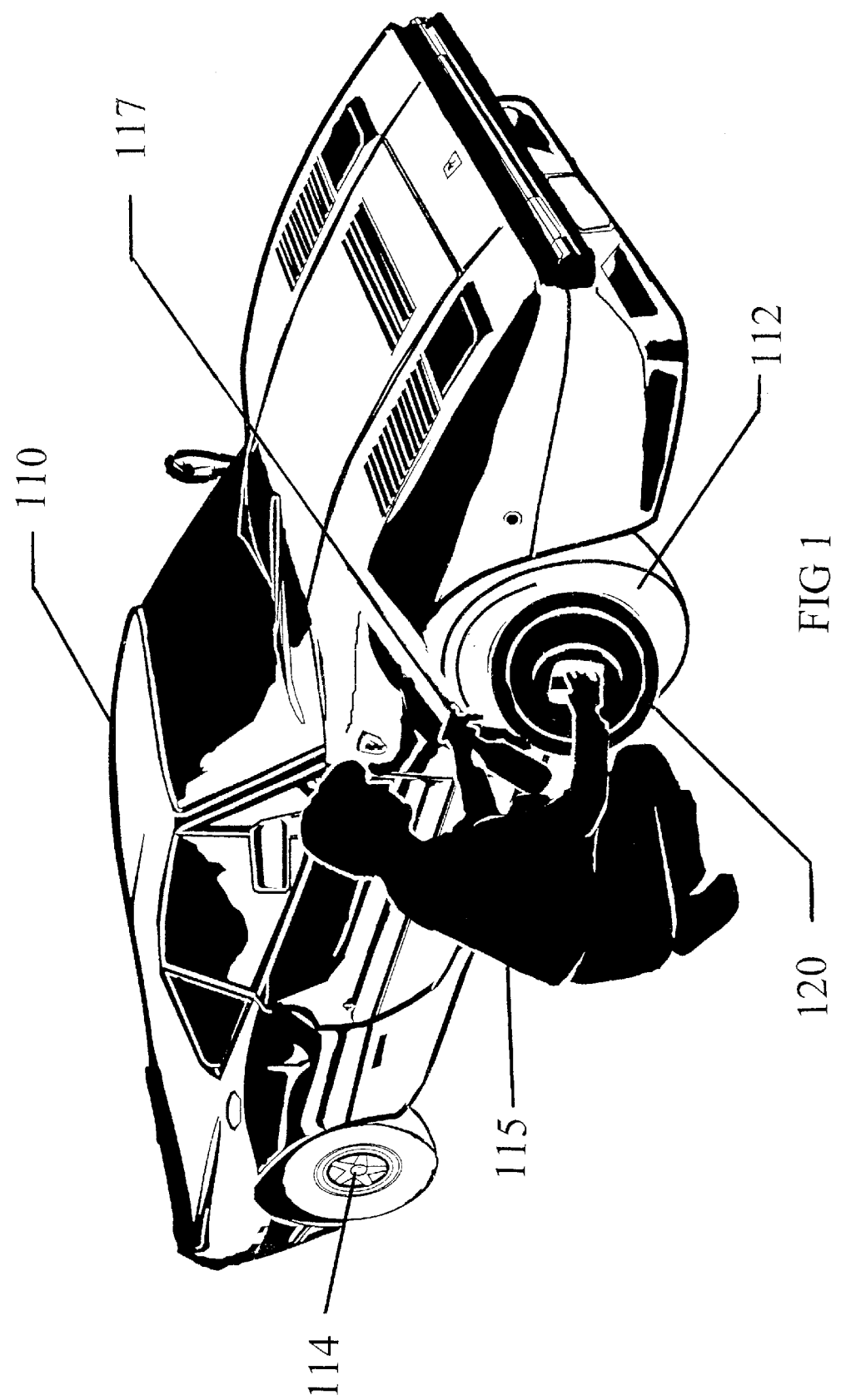
FIG. 1 shows a typical operator and the application of tire dressings to a tire using a spray mask

Referring now to FIG. 1 of the drawings, a vehicle 110 includes wheels, 114 and tires 112. These tires 112, are mounted on wheels 114 (only one visible). The vehicle owner or other user 115, illustrated crouching and spraying tire 112 with a chemical tire treatment liquid spray from container 117 held in operator's right hand. The wheel (not illustrated) which mounts tire 112 is shown being protected or masked by a protective wheel or wheel cover mask/shield 120 that is being held in place by the other hand of the operator. This wheel mask can be manufactured from one of many materials such as a single piece of plastic or injection molded plastics, aluminum sheet or aluminum die casting or thin sheet steel, wood and even cardboard for a more disposable version.

A first preferred embodiment of the improved wheel spray mask of the present invention is schematically depicted in FIGS. 2–5. As shown in FIGS. 2 & 3, wheel mask 120A covers wheel 114. This particular preferred embodiment is shown with two slots 130A cut or molded into a generally flat or domed concave enclosure surface 128A creating a center strip, a handle 132A for gripping by the operators hand. Other handles and methods for holding and placement of wheel spray mask 120A are illustrated in FIGS. 40–56.

FIG. 3, is a cross section of wheel mask 120A shown in FIG. 2, which is one preferred embodiment or example of wheel mask 120A. FIG. 4 is a 4× scale partial view of the upper portion of FIG. 3 Shown in both FIGS. 3 & 4 is tire 112 and wheel 114 for better understanding of the interface between wheel mask 120A, circular flange 122A, tire 112 and wheel 114. Extending away from circular flange surface 122A, angle 140A that defines the shape of the generally concave domed body enclosure 120A and can vary, generally 90° to 180° or as needed for the body to clear axial protrusions from the wheel or wheel cover close to the area of flange surface 122A. This angle 140A would be pre-determined prior to the molding, stamping or fabrication process. As shown in FIGS. 3 & 4, the diameter of flange 122A closely matches the outside diameter of face 116 of wheel 114. When circular flange 122A is placed against face 116 of wheel 114, a barrier to over-spray of liquids is created by having a light force P applied to the handle by the operator with his hand. Excess liquid from the application will drain into annular crevice 118 formed by tire 112 and wheel 114 and follow this annular crevice 118 downward around the diameter of wheel 114 towards ground 111, until it reaches a point where this excess liquid leaves annular crevice 118 and crosses the side wall of tire 112 and directly onto ground 111. Surface 128A is sufficiently spaced axially away from wheel 114 to clear protrusions extending axially away from wheel 114 such as knock-offs or wheel hubs that extend beyond the plane created by the outside diameter of wheel 114.

FIG. 5 illustrates the addition of an optional gasket or seal 134A affixed to circular flange 122A for improved sealing and positioning of wheel mask 120A against face 116 of wheel 114.

A second preferred embodiment of the improved wheel spray mask of the present invention is schematically depicted in FIGS. 6–10. As shown in FIG. 6, wheel mask 120B covers wheel 114. This particular preferred embodiment is shown with two slots 130B cut or molded into enclosure surface 128B creating a center strip, a handle 132B for gripping by the operators hand. Other handles and methods for holding and placement of wheel spray mask 120B are illustrated in FIGS. 40–56.

FIG. 7 is cross section of wheel mask 120B shown in FIG. 6, illustrating an example of a generally flat concave enclosure surface 128B and FIG. 8 which illustrates a generally domed concave enclosure surface 128B. FIG. 9 is a 4× scale partial view of the upper portion of FIGS. 7 & 8. Shown in FIGS. 7–9 is tire 112 and wheel 114 for better understanding of the interface between wheel mask 120B, flange 122B, tire 112, wheel 114 As shown in FIGS. 7–9, circular flange 122B closely matches the outside diameter of face 116 of wheel 114. This particular embodiment is when angle 140B is approximately equal to 90°, creating a cylindrical body. When circular flange 122B is placed against face 116 of wheel 114, a barrier to over-spray of liquids is created by having a light force P applied to the handle by the operator with his hand. Excess liquid from the application will drain into annular crevice 118 formed by tire 112 and wheel 114 and follow this annular crevice 118 downward around the diameter of wheel 114 towards ground 111, until it reaches a point where this excess liquid leaves annular crevice 118 and crosses the side wall of tire 112 and directly onto ground 111. Surface 128B is sufficiently spaced axially away from wheel 114 to clear protrusions extending axially away from wheel 114 such as knock-offs or wheel hubs that extend beyond the plane created by the outside diameter of wheel 114.

FIG. 10 illustrates the addition of an optional gasket or seal 134B attached to circular flange 122B for improved sealing and positioning of wheel mask 120B against face 116 of wheel 114.

A third preferred embodiment of the improved wheel spray mask of the present invention is schematically depicted in FIGS. 11–15. As shown in FIG. 11, wheel mask 120C covers wheel 114. This particular preferred embodiment is shown with two slots 130B cut or molded into enclosure surface 128C creating a center strip, a handle 132C for gripping by the operators hand. Other handles and methods for holding and placement of wheel spray mask 120C are illustrated in FIGS. 40–56.

FIG. 12 is a cross section of wheel mask 120C shown in FIG. 11, illustrating an example of a generally flat concave enclosure surface 128C and FIG. 13 which illustrates a generally domed concave enclosure surface 128C. FIG. 14 is a 4x scale partial view of the upper portion of FIGS. 12 & 13. Shown in FIGS. 12–14 is tire 112 and wheel 114 for better understanding of the interface between wheel mask 120C, flange 122C, tire 112, wheel 114 As shown in FIGS. 12–14, circular flange 122C, which is slightly greater in diameter than the outside diameter of face 116 of wheel 114. Many shapes are possible as shown in FIG. 12 where angle 140C is between 90° and 180°. FIG. 13 illustrates a particular preferred embodiment where angle 140C is approximately equal to 90°, creating a cylindrical body. When circular flange 122C is placed against face 116 of wheel 114, a barrier to over-spray of liquids is created by having a light force P applied to the handle by the operator with his hand. Excess liquid from the application will drain into annular crevice 118 formed by tire 112 and wheel 114 and follow this annular crevice 118 downward around the diameter of wheel 114 towards ground 111, until it reaches a point where this excess liquid leaves annular crevice 118 and crosses the side wall of tire 112 and directly onto ground 111. Surface 128C is sufficiently spaced axially away from wheel 114 to clear protrusions extending axially away from wheel 114 such as knock-offs or wheel hubs.

FIG. 15 illustrates the addition of an optional gasket or seal 134C attached to circular flange 122C for improved sealing and positioning of wheel mask 120C against face 116 of wheel 114.

A fourth preferred embodiment of the improved wheel spray mask of the present invention is schematically depicted in FIGS. 16–19. As shown in FIG. 16, wheel mask 120D covers wheel 114. This particular preferred embodiment is shown with two slots 130D cut or molded into enclosure surface 128D creating a center strip, a handle 132B for gripping by the operators hand. Other handles and methods for holding and placement of wheel spray mask 120D are illustrated in FIGS. 40–56.

FIG. 17 is a cross section of wheel mask 120D shown in FIG. 16 with tire 112 and wheel 114 shown for better understanding of the interface between wheel mask 120D, with tire 112 and wheel 114. As shown in FIG. 18, this preferred embodiment is comprised of a flat circular enclosure surface 128D that closely matches or is slightly larger than the outside diameter of face 116 of wheel 114. When flat circular surface 128D is placed against face 116 of wheel 114, a barrier to over-spray of liquids is created by having a light force P applied to the handle by the operator with his hand. Excess liquid from the application will drain into annular crevice 118 formed by tire 112 and wheel 114 and follow this annular crevice downward around the diameter of wheel 114 towards ground 111, until it reaches a point where this excess liquid leaves annular crevice 118 and crosses the side wall of tire 112 and directly onto ground 111. Flat circular enclosure surface 128D is sufficiently spaced axially away from wheel 114 to clear minimal protrusions extending axially away from wheel 114. This particular version would be sufficient for many OEM and even many aftermarket wheel that do not have such features as knock-offs or wheel hubs that extend beyond the plane created by the outside diameter of wheel 114.

FIG. 19 illustrate the addition of an optional seal or gasket 134D attached to the face 116 of flat thin walled circular surface 128D at is outer diameter for improved sealing and positioning of wheel mask 120D against face 116 of wheel 114.

A fifth preferred embodiment of the improved wheel spray mask flange area detail as is schematically depicted in FIGS. 20 & 21, a cross section of flange 122A–122D as described above, with the addition of an optional gasket or seal 134E, which is placed on the edge of circular flange surface 122A–122D. This seal may have the addition of an adhesive to aid in its securing to the flange edge, however it may not be necessary to use an adhesive method, if the seal or gasket material is able to be stretched during placement on the edge of circular flange 122A–122D without permanently stretching seal or gasket 134E so that seal or gasket 134E would be self retaining. With the addition of this style of gasket or seal, the diameter of wheel mask 120A–120D including gasket or seal 134E may either closely match the diameter of the face 116 of wheel 114 or wheel cover as shown in FIG. 20 or the diameter flange 122A–122D of wheel mask 120A–120D may be slightly larger than the wheel or wheel cover diameter as shown in FIG. 21, which is an alternative example of the cross section of circular flange 122A–122D of wheel mask 120A–120D.

A sixth preferred embodiment of the improved wheel spray mask of the present invention is schematically depicted in FIGS. 22–26. As shown in FIG. 22, wheel mask 120F which covers wheel 114. This particular preferred embodiment is shown with two slots 130F cut or molded into enclosure surface 128F creating a center strip, a handle 132F for gripping by the operators hand. Other handles and methods for holding and placement of wheel spray mask 120F are illustrated in FIGS. 40–56.

FIG. 23 is a cross section of wheel mask 120F shown in FIG. 22 illustrating an example of a generally flat concave enclosure surface 128F and FIG. 24 which illustrates an example of a generally domed concave enclosure surface 128F. FIG. 25 is a 4x scale partial view of the upper portion of FIGS. 23 & 24. Shown in FIGS. 23–25 is tire 112 and wheel 114 for better understanding of the interface between wheel mask 120F, with it's thin walled cylindrical body 126F, tire 112 and wheel 114. As shown in FIGS. 23–25, the outside diameter of thin wall body 126F closely matches the outside diameter of face 116 of wheel 114. When the edge of thin walled cylindrical body 126F is placed against face 116 of wheel 114, a barrier to over-spray of liquids is created by having a light force P applied to the handle by the operator with his hand. Excess liquid from the application will drain into annular crevice 118 formed by tire 112 and wheel 114 and follow this annular crevice 118 downward around the diameter of wheel 114 towards ground 111, until it reaches a point where this excess liquid leaves annular crevice 118 and crosses the side wall of tire 112 and directly onto ground 111. Surface 128F is sufficiently spaced axially away from wheel 114 to clear protrusions extending axially away from wheel 112 such as knock-offs or wheel hubs.

FIG. 26 illustrates the addition of an optional gasket or seal 134F attached to the edge of cylindrical body 126F for improved sealing and positioning of wheel mask 120F against face 116 of wheel 114.

Figure 27:
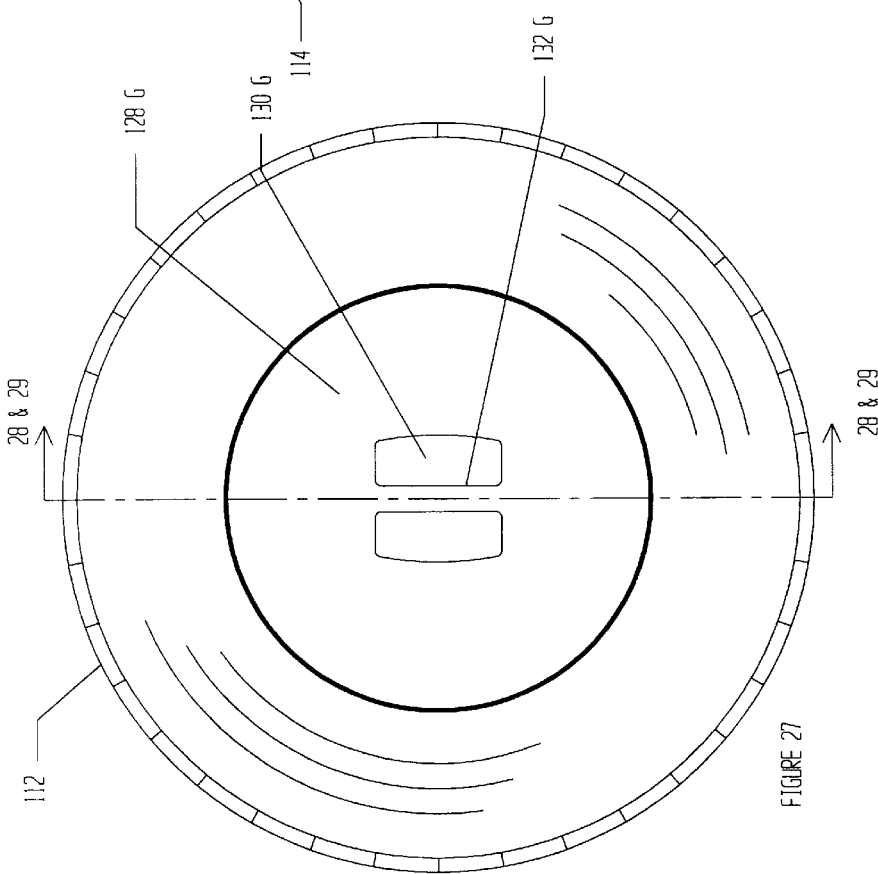

A seventh preferred embodiment of the improved wheel spray mask of the present invention is schematically depicted in FIGS. 27–31. As shown in FIG. 27, wheel mask 120G comprises a thin walled cylindrical body 126G and a generally flat or domed concave enclosure surface 128G. This particular preferred embodiment is shown with two slots 130G cut or molded into enclosure surface 128G creating a center strip, a handle 132G for gripping by the operators hand. Other handles and methods for holding and placement of wheel spray mask 120G are illustrated in FIGS. 40–56.

Figure 29:
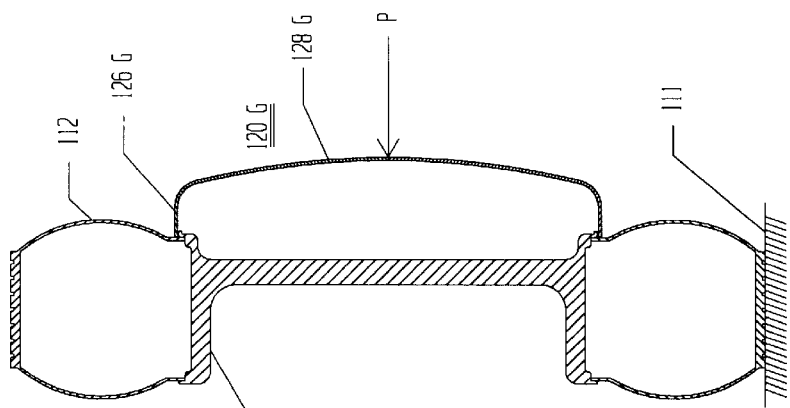
Figure 28:
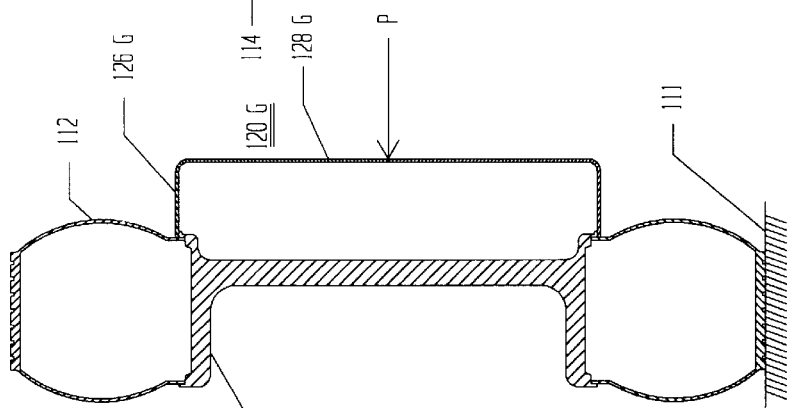

FIG. 28 is a cross section of wheel mask 120G shown in FIG. 27, illustrating an example of a generally flat concave enclosure surface 128G and FIG. 29 which illustrates an example of a generally domed concave enclosure surface 128G. FIG. 30 is a 4× scale partial view of the upper portion of FIGS. 28 & 29. Shown in FIGS. 28–30 is tire 112 and wheel 114 shown for better understanding of the interface between wheel mask 120G, with it's thin walled cylindrical body 126G, tire 112 and wheel 114. As shown in FIGS. 28–30, the inside diameter of thin wall cylindrical body section 126G, is slightly greater than the outside diameter of face 116 of wheel 114. When the edge of thin walled cylindrical body 126G is in annular crevice 118 formed by tire 112 and wheel 114, a barrier to over-spray of liquids is created by having a light force P applied to the handle by the operator with his hand. Excess liquid from the application will drain into annular crevice 118 formed by tire 112 and wheel 114 and follow this annular crevice 118 downward around the diameter of wheel 114 towards ground 111, until it reaches a point where this excess liquid leaves annular crevice 118 and crosses the side wall of tire 112 and directly onto ground 111. Surface 128G is sufficiently spaced axially away from wheel 114 to clear protrusions extending axially away from wheel 114 such as knock-offs or wheel hubs that extend beyond the plane created by the outside diameter of wheel 114.

FIG. 31 illustrates the addition of an optional seal or gasket 134G attached to the edge of thin walled circular body 126G for improved sealing and positioning of wheel mask 120G into annular crevice 118 formed by tire 112 and wheel 114.

An eighth preferred embodiment of the improved wheel mask of the present invention is schematically depicted in FIGS. 32–35. As shown in FIG. 32, wheel mask 120H which covers wheel 114. This particular preferred embodiment is shown with two slots 130H cut or molded into enclosure surface 128H creating a center strip, a handle 132H for gripping by the operators hand. Other handles and methods for holding and placement of wheel spray mask 120H are illustrated in FIGS. 40–56.

FIG. 33 is a cross section of wheel mask 120H shown in FIG. 28, which illustrates a generally domed concave enclosure surface 128H that extends completely to the vehicle wheel interface surface, annular crevice 118. FIG. 34 is a 4× scale partial view of the upper portion of FIG. 33. Shown in FIGS. 33 & 34 is tire 112 and wheel 114 shown for better understanding of the interface between wheel mask 120H, with the edge of it's thin walled generally concave body 128H, tire 112 and wheel 114. As shown in FIGS. 33 & 34, the inside diameter of the edge of generally concave body 128H at the interface surface, is slightly greater than the outside diameter of face 116 of wheel 114. When the edge of thin walled generally concave body 128H is in annular crevice 118 formed by tire 112 and wheel 114, a barrier to over-spray of liquids is created by having a light force P applied to the handle by the operator with his hand. Excess liquid from the application will drain into annular crevice 118 formed by tire 112 and wheel 114 and follow this annular crevice 118 downward around the diameter of wheel 114 towards ground 111, until it reaches a point where this excess liquid leaves annular crevice 118 and crosses the side wall of tire 112 and directly onto ground 111. Surface 128H is sufficiently spaced axially away from wheel 114 to clear protrusions extending axially away from wheel 114 such as knock-offs or wheel hubs that extend beyond the plane created by the outside diameter of wheel 114.

FIG. 35 illustrates the addition of an optional seal or gasket 134H attached to the edge of thin walled circular body 128H for improved sealing and positioning of wheel mask 120H into annular crevice 118 formed by tire 112 and wheel 114.

A ninth preferred embodiment of the improved wheel spray mask of the present invention is schematically depicted in FIGS. 36–39. As shown in FIG. 36, wheel mask 120I which covers wheel 114. This particular preferred embodiment is shown with two slots 130I cut or molded into enclosure surface 128I creating a center strip, a handle 132I for gripping by the operators hand. Other handles and methods for holding and placement of wheel spray mask 120I are illustrated in FIGS. 40–56.

FIG. 37 is a cross section of wheel mask 120I shown in FIG. 36, which illustrates a generally domed concave surface enclosure 128I that extends completely to the vehicle wheel interface surface. FIG. 38 is a 4× scale partial view of the upper portion of FIG. 37. Shown in FIGS. 37 & 38 is tire 112 and wheel 114 for better understanding of the interface between wheel mask 120I, with the edge of it's thin walled generally domed concave body 128I, tire 112 and wheel 114. As shown in FIGS. 37 & 38, the outside diameter of thin wall concave body section 128I closely matches the outside diameter of face 116 of wheel 114. When the edge of thin walled generally concave body 128I is placed against face 116 of wheel 114, a barrier to over-spray of liquids is created by having a light force P applied to the handle by the operator with his hand. Excess liquid from the application will drain into annular crevice 118 formed by tire 112 and wheel 114 and follow this annular crevice 118 downward around the diameter of wheel 114 towards ground 111, until it reaches a point where this excess liquid leaves annular crevice 118 and crosses the side wall of tire 112 and directly onto ground 111. Surface 128I is sufficiently spaced axially away from wheel 114 to clear protrusions extending axially away from wheel 114 such as knock-offs or wheel hubs that extend beyond the plane created by the outside diameter of wheel 114.

FIG. 39 illustrates the addition of an optional seal or gasket 134I attached to the edge of thin walled concave body 128I for improved sealing and positioning of wheel mask 120I against face 116 of wheel 114.

FIGS. 40–56 illustrate some other preferred embodiments of handles, hand-grips and other methods for gripping and placement of wheel mask(s) 120A–I onto wheel 114.

FIGS. 40 & 41 illustrate the addition of cushioned handgrip 136J wrapping around handle 132A–132I, made from a soft material such as neoprene, foam, cloth or any other compound that creates a soft hand-grip 136J for improved comfort of the operators hand as it grips hand-grip 136J. FIG. 41 is a cross section view of FIG. 40, illustrating this cushioned hand-grip 136J. This cushioned hand-grip 136J can be attached by one of many methods; such as adhesives, hook and loop fasteners, stitching, snaps or buttons.

Figure 43:
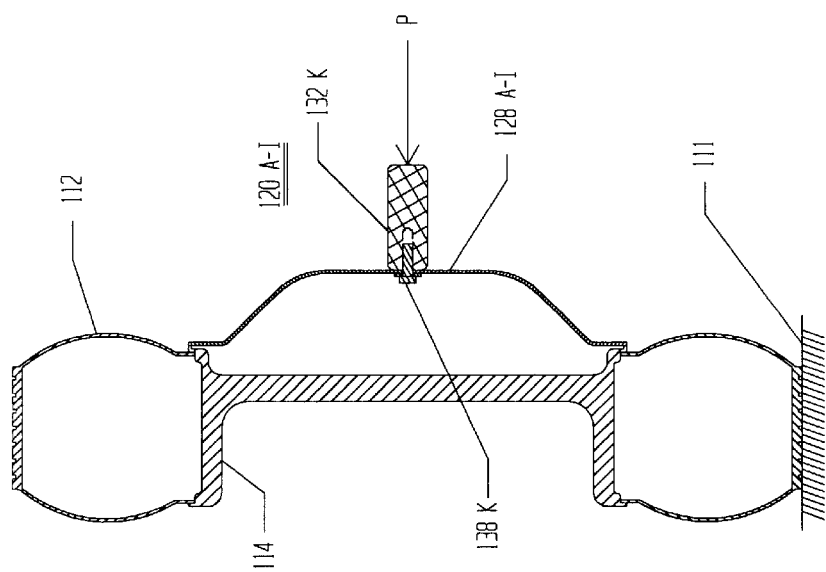
Figure 42:
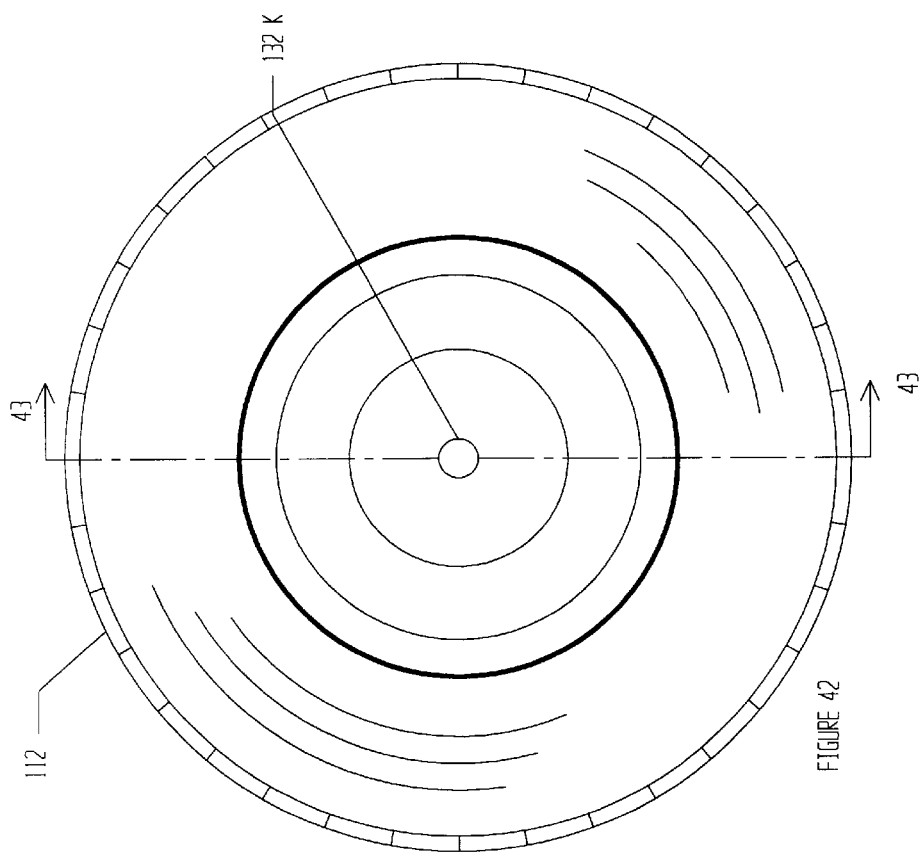

FIGS. 42–44 illustrate another preferred embodiment of a handle design to the previously described and illustrated wheel masks. FIG. 43 is a cross section of FIG. 42, a typical wheel mask for the illustration of another preferred embodiment of a handle design 132K, whereas a generally cylindrical shaped and separate handle or hand-grip 132K is attached to generally flat or concave domed surface depicted as 128A–128I. This handle or hand-grip 132K shall be attached with hardware 138K. Handle or hand-grip 132K may be tapped with threads for the acceptance of such hardware. Other hardware fastening methods could be used such as self-tapping screws or rivets. FIG. 44 is a 4× scale partial view of the upper portion of FIG. 43, illustrating for better clarity, handle 132K and hardware 138K.

FIGS. 45–47 illustrate another preferred embodiment of a handle design to the previously described and illustrated wheel masks. FIG. 46 is a cross section of FIG. 45, a typical wheel mask for the illustration of another preferred embodiment of a handle design, whereas a generally cylindrical shaped and separate handle or hand-grip 132L is attached to generally flat or concave domed surface depicted as 128A–128I. This preferred embodiment of a handle or hand-grip 132L shall be attached with an integrated snap feature as shown 139L. While this method is intended to be of a more permanent nature, the handle can still be removed by squeezing snap legs 139L together while pulling handgrip 132L away from generally flat or concave domed surface depicted as 128A–128I. FIG. 47 is a 4× scale partial view of the upper portion of FIG. 46, illustrating for better clarity, handle 132L and integral snap feature 139L.

FIGS. 48–50 illustrate another preferred embodiment of a handle design to the previously described and illustrated wheel masks. FIG. 49 is a cross section of FIG. 48, a typical wheel mask for the illustration of another preferred embodiment of a handle design, whereas a generally u-shaped and separate handle or hand-grip 132M is attached to the generally flat or concave domed surface depicted as 128A–128I. This handle or hand-grip 132M shall be attached with hardware 138M. The handle or hand-grip may be tapped with threads for the acceptance of such hardware. Other hardware fastening methods could be used such as selftapping screws or rivets. FIG. 50 is a 4× scale partial view of the upper portion of FIG. 49, illustrating for better clarity, handle 132M and hardware 138M.

Figure 53:
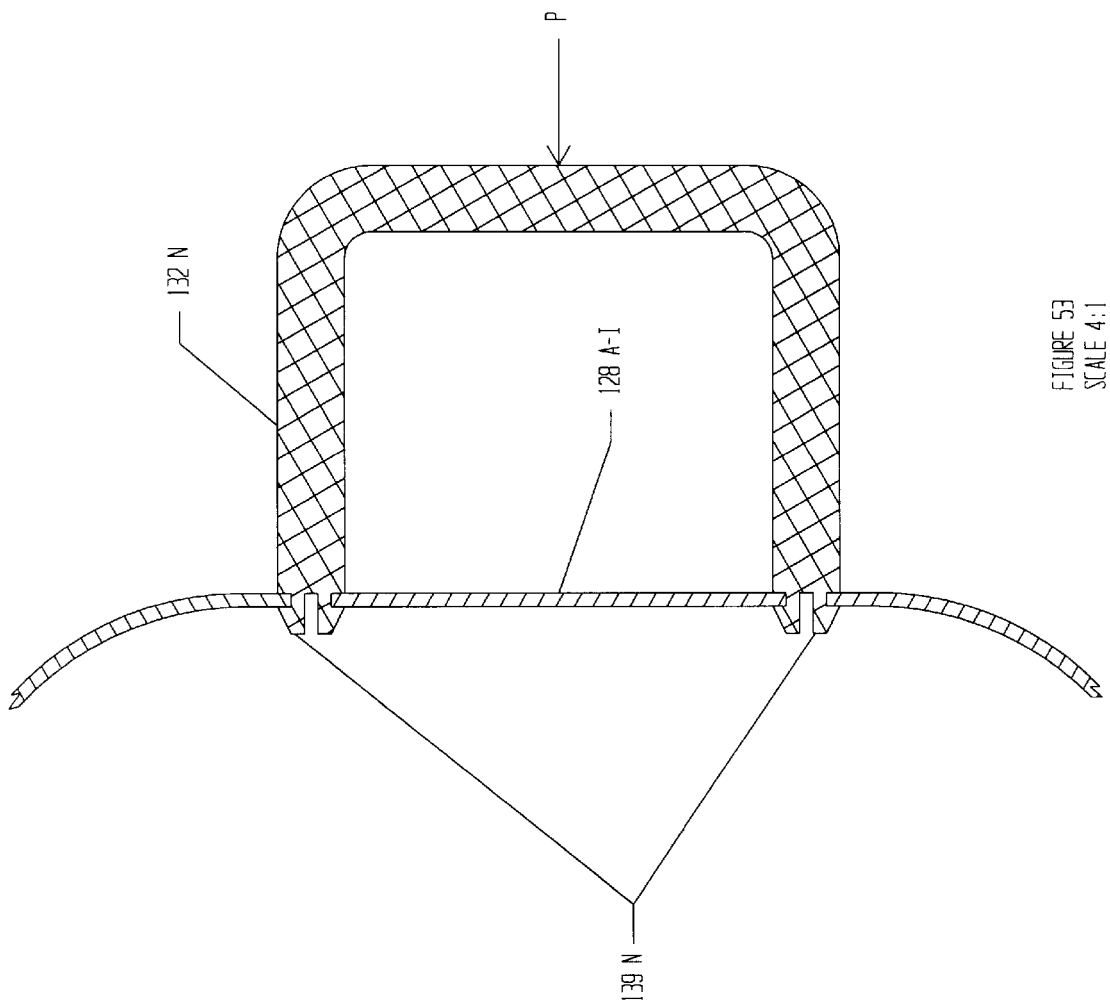

FIGS. 51–53 illustrate another preferred embodiment of a handle design to the previously described and illustrated wheel masks. FIG. 52 is a cross section of FIG. 51, a typical wheel mask for the illustration of another preferred embodiment of a handle design, whereas a generally u-shaped and separate handle or hand-grip 132N is attached to generally flat or concave domed surface depicted as 128A–128I. This handle or hand-grip 132N shall be attached with an integrated snap feature as shown. While this method is intended to be of a more permanent nature, handle 132N can still be removed by squeezing snap legs 139N together while pulling hand-grip 132N away from generally flat or concave domed surface depicted as 128A–128I. FIG. 53 is a 4× scale partial view of the upper portion of FIG. 52, illustrating for better clarity, handle 132N and integral snap feature 139N.

FIG. 54 is a cross section of a typical wheel mask for the illustration of another preferred embodiment of a handle design, whereas an outwardly protruding handle or handgrip shape 132O is a integrally molded or stamped feature that is molded or stamped directly into to generally flat or concave domed surface depicted as 128A–128I. This handle or hand-grip 132O could take on many shapes that would be easily gripped or held by the operators hand.

FIG. 55 is a cross section of a typical wheel mask for the illustration of another preferred embodiment of a handle design, whereas an inwardly protruding handle or hand-grip shape 132P is a integrally molded or stamped feature that is molded or stamped directly into to generally flat or concave domed surface depicted as 128A–128I. This handle or hand-grip 132P could take on many shapes that would be easily gripped or held by the operator's hand.

Figure 56:
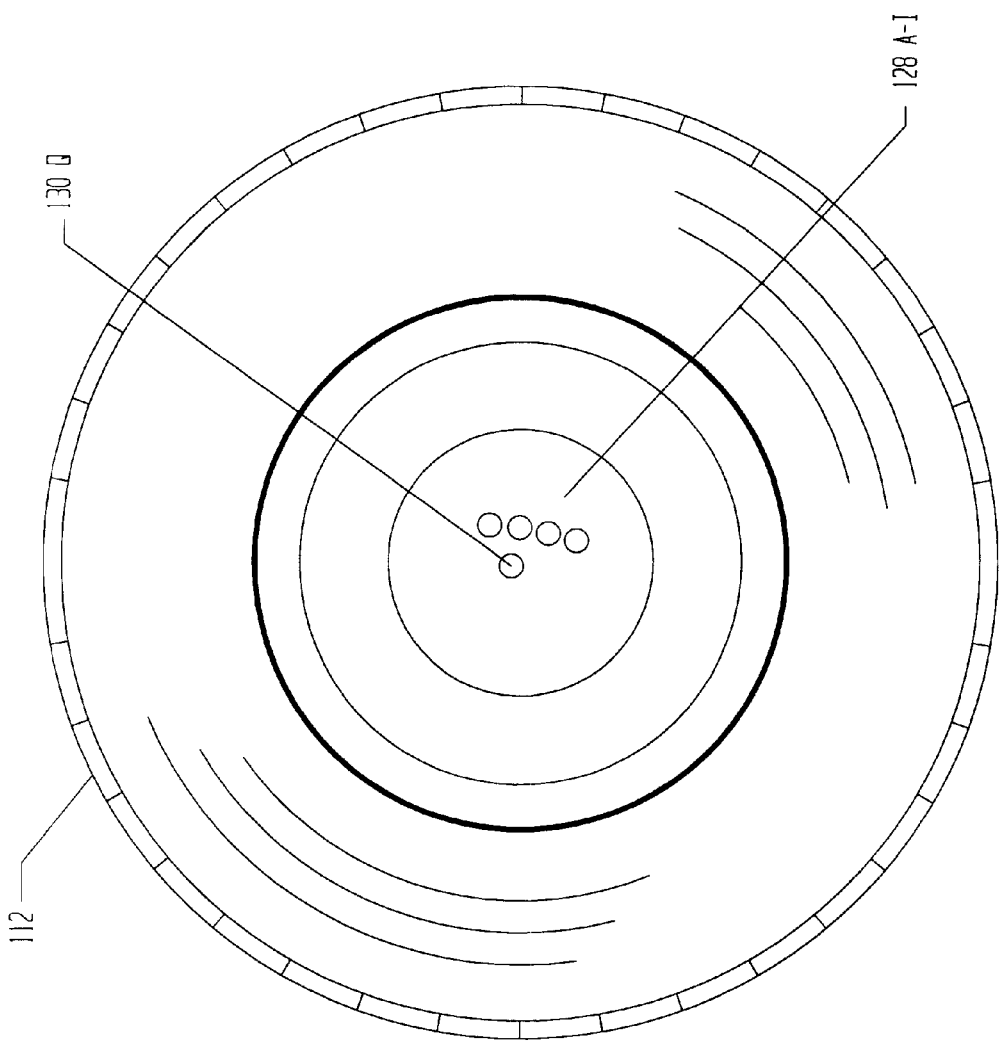
FIG. 56 illustrates various aspects of another style of a handle or handgrip that consists of a plurality of holes in the concave surface for use with the operators fingers.

FIG. 56 is a front view a of typical wheel mask for the illustration of another preferred embodiment of a handle design, whereas at least one hole of sufficient diameter 130Q to allow the operators finger to pass through and grip. This hole or plurality of holes 130Q is/are integrally cut or molded into to generally flat or concave domed surface depicted as 128A–128I. This hole(s) could vary in the quantity, pattern and placement.

Advantages

From the description above, a number of advantages of my vehicle wheel detailing mask become evident:

a) Its design allows for a maximum amount of the tire sidewall to be treated, while providing the needed protection for the vehicle wheel.

b) It is appropriately sized for a specific vehicle wheel, with no assembly modification required. The operator simply chooses a specific size wheel mask for the particular size of wheels on the vehicle.

c) It is made from a lightweight material, such as ABS or polystyrene.

d) It can be manufactured from plastic with a significant portion of recycled or reclaimed composition.

e) Using plastic for its manufacture also provides a material that will not scratch or damage the vehicle wheels.

f) It's use provides for a great amount of time and labor savings while detailing tires, thus allowing the owner/operator the ability to detail the tires more frequently, thereby keeping those tires on those great looking wheels looking sharp!

Conclusion, Ramifications, and Scope

Accordingly, the reader will see that the hand held wheel spray mask can be used to quickly and effectively cover a vehicle wheel while a protectant or other tire dressing or cleaner is applied to the tire and its sidewall. In addition, the hand held wheel spray mask has been appropriately sized for each of the many wheel sizes, leaving the operator to simply picking up the wheel mask, gently pressing it against the wheel or tire, quickly applying the dressing and in a matter of seconds moving to the next tire, all without any overspray reaching the surface of the wheel.

Furthermore the hand held wheel mask has the additional advantages in that it is a self contained unit with no required assembly by the operator;

it provides the integration of a simple yet effective gasket or seal if needed.;

it is engineered such that one mask fits one wheel, no "one size fits all", without the need for any latching mechanism;

it permits the production of wheel masks from a tough and durable plastic while providing a material that will not damage the wheel from abrasion or impact;

it permits the production of wheel masks from recycled plastics it permits the use of many different colors of masks;

Although the descriptions above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

What is claimed is:

1. A temporary hand-held wheel spray mask device that covers a vehicle wheel or wheel cover, which prevents over spray or drips during the application of tire cleaners, tire dressings, protectants or paints onto the tire or tire sidewall from being applied to the vehicle wheel or wheel cover while said spray mask is pressed against said wheel or wheel cover with a light force from the operators hand, said mask comprising:

a flat circular planar interface means with a predetermined outside diameter that approximately matches the outermost diameter of the vehicle wheel, such that a plurality of separate wheel masks with predetermined diameters will be necessary for the variety of wheel sizes that are available for vehicles; and a generally domed concave hollow enclosure means attached in a contiguous manner to said flat circular planar interface means, thereby enclosing said vehicle wheel or wheel cover and terminating at a predetermined spaced axial position from the face of said wheel to clear any protrusions from said wheel or wheel cover; and a grasping means on said wheel mask for the operator's hand or fingers for the purpose of positioning and holding of said mask;

whereby said flat circular planar interface means of said mask is positioned and held in place with the face of said flat circular planar interface means pressed against the face of said wheel or wheel cover at its outermost diameter with a light force applied by the operator's hand or fingers to said grasping means on said mask, thereby enclosing the wheel or wheel cover and creating a barrier at the wheel's outermost diameter; whereby said hollow enclosure means will prevent over spray or drips during the application of tire cleaners, tire dressings, protectants or paints onto the tire or tire sidewall from being applied to the vehicle wheel.

2. The wheel spray mask of claim 1 wherein said flat circular planar interface means becomes an annular flange described by a predetermined outer diameter and a predetermined inside diameter at which point said annular flange transitions contiguously into said generally domed concave hollow enclosure means.

3. The wheel spray mask of claim 2, further including the addition of a gasket or seal that is affixed to said annular flange face surface or said annular flange outer diameter edge surface of said mask for the purpose of acting as an improved barrier against the tire cleaners, dressing or paints for improved sealing at the interface between said wheel mask annular flange face surface and the vehicle wheel or wheel cover as said mask is placed against the wheel or wheel cover.

4. A temporary hand-held wheel spray mask device that covers a vehicle wheel or wheel cover, which prevents over spray or drips during the application of tire cleaners, tire dressings, protectants or paints onto the tire or tire sidewall from being applied to the vehicle wheel or wheel cover while said spray mask is pressed against the face of said wheel or wheel cover with a light force from the operators hand, said mask comprising:

a flat circular planar interface means with a predetermined outside diameter that approximately matches the outermost diameter of the vehicle wheel, such that a plurality of separate wheel masks with predetermined diameters will be necessary for the variety of wheel sizes that are available for vehicles; and the flat circular planar interface means forms a flat planar enclosure means of predetermined size; and a grasping means on said mask for the operator's hand or fingers, for the purpose of positioning and holding of said mask; and a sealing means whereby a gasket or seal that is affixed to said flat circular planar interface face surface or said flat circular planar interface outer diameter edge surface of said mask for the purpose of acting as an improved barrier against the tire cleaners, tire dressings, protectants or paints for improved sealing at the interface between said wheel mask flat circular planar interface surface and the vehicle wheel or wheel cover as said mask is placed against the wheel or wheel cover, whereby said flat circular interface means of said mask is positioned and held in place with said flat circular interface means and sealing means is pressed against the face of said wheel or wheel cover at its outermost diameter with a light force applied by the operator's hand or fingers to said grasping means on said mask, thereby enclosing the wheel or wheel cover and creating a barrier at the wheel's outermost diameter; whereby said flat planar enclosure means and sealing means will prevent over spray or drips during the application of tire cleaners, tire dressings, protectants or paints onto the tire or tire sidewall from being applied to the vehicle wheel.

5. A temporary hand-held wheel spray mask device that covers a vehicle wheel or wheel cover, which prevents over spray or drips during the application of tire cleaners, tire dressings, protectants or paints onto the tire or tire sidewall from being applied to the vehicle wheel or wheel cover while said mask is pressed against said wheel or wheel cover with a light force from the operators hand, said mask comprising:

a thin walled cylindrical interface section with a predetermined outside diameter that approximately matches the outermost diameter of the vehicle wheel, such that a plurality of separate wheel masks with predetermined diameters will be necessary for the variety of wheel sizes that are available for vehicles, wherein said cylindrical section projects axially away from the wheel at a predetermined distance; and a generally domed concave hollow enclosure means attached in a contiguous manner to said thin walled cylindrical interface section, thereby enclosing said vehicle wheel or wheel cover and terminating at a predetermined spaced axial position from the face of said wheel to clear any protrusions from said wheel or wheel cover; and a grasping means on said mask for the operator's hand or fingers, for the purpose of positioning and holding of said mask; and a sealing means whereby a gasket or seal is affixed to the edge surface of said thin walled cylindrical interface section of said mask for the purpose of acting as a barrier against the tire cleaners, tire dressing, protectants or paints for sealing the interface between said mask thin walled cylindrical interface edge surface and the vehicle wheel or wheel cover as said mask is placed against the wheel or wheel cover;

whereby said thin walled cylindrical interface section of said mask with sealing means is positioned and held in place with the edge of said thin walled cylindrical section and sealing means pressed against the face of said wheel or wheel cover at its outermost diameter with a light force applied by the operator's hand or fingers to said grasping means on said mask, thereby enclosing the wheel or wheel cover and creating a barrier at the wheel's outermost diameter; whereby said hollow enclosure means will prevent over spray or drips during the application of tire cleaners, tire dressings, protectants or paints onto the tire or tire sidewall from being applied to the vehicle wheel.

6. A temporary hand-held wheel spray mask device that covers a vehicle wheel or wheel cover, which prevents over spray or drips during the application of tire cleaners, tire dressings, protectants or paints onto the tire or tire sidewall from being applied to the vehicle wheel or wheel cover while said mask is pressed against the sidewall of the tire with a light force from the operators hand, said mask comprising:

a thin walled cylindrical interface section concentrically adjacent to the outer diameter of said wheel, projecting a predetermined axial distance away from the wheel and tire and is comprised of a predetermined inside diameter that is slightly greater in diameter than the outermost diameter of said vehicle wheel, such that a plurality of separate wheel spray masks with predetermined diameters will be necessary for the variety of wheel sizes that are available for vehicles; and a generally domed concave hollow enclosure means attached in a contiguous manner to said thin walled cylindrical interface section, thereby enclosing said vehicle wheel or wheel cover and terminating at a predetermined spaced axial position from the face of said wheel to clear any protrusions from said wheel or wheel cover; and a grasping means on said mask for the operator's hand or fingers for the purpose of positioning and holding of said mask; and a sealing means whereby a gasket or seal is affixed to the edge surface of said thin walled cylindrical interface section of said mask for the purpose of acting as a barrier against the tire cleaners, tire dressing, protectants or paints for sealing the interface between said mask thin walled cylindrical interface edge surface and the tire sidewall concentrically outwardly adjacent to the outermost diameter of the vehicle wheel or wheel cover;

whereby said thin walled cylindrical interface section of said mask with sealing means affixed to it's edge is positioned and held in place such that the edge of said thin walled cylindrical interface section with sealing means is pressed flush against the tire sidewall concentrically outwardly adjacent to said wheel or wheel cover at its outermost diameter with a light force applied by the operator's hand or fingers to said grasping means on said mask, thereby enclosing the wheel or wheel cover and creating a barrier at the wheel's outermost diameter; whereby said hollow enclosure means will prevent over spray or drips during the application of tire cleaners, tire dressings, protectants or paints onto the tire or tire sidewall from being applied to the vehicle wheel.

7. A temporary hand-held wheel spray mask device that covers a vehicle wheel or wheel cover, which prevents over spray or drips during the application of tire cleaners, tire dressings, protectants or paints onto the tire or tire sidewall from being applied to the vehicle wheel or wheel cover while the mask is pressed against said wheel or wheel cover with a light force from the operators hand, said mask comprising:

a thin walled concave interface section with a predetermined outside diameter that approximately matches the outermost diameter of the vehicle wheel, such that a plurality of separate wheel masks with predetermined diameters will be necessary for the variety of wheel sizes that are available for vehicles, and a generally domed concave hollow enclosure means attached in a contiguous manner to said thin walled concave interface section, thereby enclosing said vehicle wheel or wheel cover and terminating at a predetermined spaced axial position from the face of said wheel to clear any protrusions from said wheel or wheel cover; and a grasping means on said wheel mask for the operator's hand or fingers for the purpose of positioning and holding of said mask;

a sealing means whereby a gasket or seal is affixed to the edge surface of said thin walled concave interface section of said mask for the purpose of acting as a barrier against the tire cleaners, tire dressing, protectants or paints for sealing the interface between said mask thin walled concave interface edge surface and the tire sidewall vehicle wheel or wheel cover as said mask is placed against the wheel or wheel cover; concentrically adjacent to said wheel or wheel cover at its outermost diameter;

whereby said thin walled concave interface section of said wheel mask with sealing means affixed to it's edge, is positioned and held in place with the edge of said thin walled concave interface section and sealing means pressed against the face of said wheel or wheel cover at its outermost diameter with a light force applied by the operator's hand or fingers to said grasping means on said wheel mask, thereby enclosing the wheel or wheel cover and creating a barrier at the wheel's outermost diameter; whereby said hollow enclosure means will prevent over spray or drips during the application of tire cleaners, tire dressings, protectants or paints onto the tire or tire sidewall from being applied to the vehicle wheel.

8. A temporary hand-held spray mask device that covers a vehicle wheel or wheel cover, which prevents over spray or drips during the application of tire cleaners, tire dressings, protectants or paints onto the tire or tire sidewall from being applied to the vehicle wheel or wheel cover while said mask is pressed against the sidewall of said tire with a light force from the operators hand, said mask comprising:

a thin walled concave interface section concentrically adjacent to the outer diameter of said wheel and is comprised of a predetermined inside diameter that is slightly greater in diameter than the outermost diameter of said vehicle wheel, such that a plurality of separate wheel masks with predetermined diameters will be necessary for the variety of wheel sizes that are available for vehicles; and a generally domed concave hollow enclosure means attached in a contiguous manner to said thin walled concave interface section, thereby enclosing said vehicle wheel or wheel cover and terminating at a predetermined spaced axial position from the face of said wheel to clear any protrusions from said wheel or wheel cover; and a grasping means on said mask for the operator's hand or fingers for the purpose of positioning and holding of said mask; and a sealing means whereby a gasket or seal is affixed to the edge surface of said thin walled concave interface section of said mask for the purpose of acting as a barrier against the tire cleaners, tire dressing, protectants or paints for sealing the interface between said mask thin walled concave interface edge surface and the tire sidewall vehicle wheel or wheel cover as said mask is placed against the tire sidewall concentrically adjacent to the outermost diameter of the wheel or wheel cover;

whereby said thin walled concave interface section of said mask is positioned and held in place such that the edge of said thin walled concave interface section with sealing means is pressed flush against the tire sidewall outwardly concentrically adjacent to said wheel or wheel cover at its outermost diameter with a light force applied by the operator's hand or fingers to a grasping means on said mask, thereby enclosing the wheel or wheel cover and creating a barrier at the wheel's outermost diameter, and a hollow enclosure that will prevent over spray or drips during the application of tire cleaners, tire dressings, protectants or paints onto the tire or tire sidewall from being applied to the vehicle wheel.

* * * * *